(12) United States Patent
Classon et al.

(10) Patent No.: US 8,780,937 B2
(45) Date of Patent: *Jul. 15, 2014

(54) METHOD AND APPARATUS FOR REDUCING ROUND TRIP LATENCY AND OVERHEAD WITHIN A COMMUNICATION SYSTEM

(75) Inventors: Brian K. Classon, Palatine, IL (US); Kevin L. Baum, Rolling Meadows, IL (US); Amitava Ghosh, Buffalo Grove, IL (US); Robert T. Love, Barrington, IL (US); Vijay Nangia, Algonquin, IL (US); Kenneth A. Stewart, Grayslake, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/218,661

(22) Filed: Aug. 26, 2011

(65) Prior Publication Data

US 2011/0310837 A1  Dec. 22, 2011

Related U.S. Application Data

(63) Continuation of application No. 11/276,982, filed on Mar. 20, 2006, now Pat. No. 8,031,583.

(60) Provisional application No. 60/666,494, filed on Mar. 30, 2005.

(51) Int. Cl.
*H04J 3/24* (2006.01)
*H04B 7/26* (2006.01)

(52) U.S. Cl.
CPC .................................. *H04B 7/2656* (2013.01)
USPC ........................................ 370/470

(58) Field of Classification Search
CPC  H04B 7/2656; H04L 5/0007; H04L 27/2666; H04N 21/26616
USPC ......... 370/203, 208, 319, 328, 329, 330, 343, 370/344, 470–474, 476; 375/130, 140, 141
See application file for complete search history.

(56) References Cited

U.S. PATENT DOCUMENTS

| | | | |
|---|---|---|---|
| 5,991,279 | A | 11/1999 | Haugli et al. |
| 6,130,886 | A | 10/2000 | Ketseoglou et al. |
| 6,813,284 | B2 | 11/2004 | Vayanos et al. |
| 7,139,239 | B2 | 11/2006 | McFarland |

(Continued)

FOREIGN PATENT DOCUMENTS

| | | |
|---|---|---|
| JP | 2004088270 A | 3/2004 |
| WO | 0016314 A2 | 3/2000 |

(Continued)

OTHER PUBLICATIONS

Das, A. et al.: A2IR: An asynchronous and adaptive hybrid ARQ scheme for 3G evolution, Vehicular Technology Conference, 2001, VTC 2001 Spring, IEEE VTS 53rd vol. 1, May 6-9, 2001, pp. 628-632, vol. 1.

(Continued)

*Primary Examiner* — Paul H Masur

(57) ABSTRACT

During operation radio frames are divided into a plurality of subframes. A frame duration is selected from two or more possible frame durations. Further, a subframe type is selected from two or more types of subframes. Data is placed within the plurality of subframes and is transmitted over the radio frames.

25 Claims, 19 Drawing Sheets

(56) References Cited

U.S. PATENT DOCUMENTS

| | | |
|---|---|---|
| 7,142,888 B2 | 11/2006 | Okawa et al. |
| 7,366,117 B2 | 4/2008 | Kim et al. |
| 7,426,196 B2 | 9/2008 | Gopalakrishnan et al. |
| 2002/0122395 A1 | 9/2002 | Bourlas et al. |
| 2002/0126706 A1 | 9/2002 | Laroia et al. |
| 2003/0072255 A1 | 4/2003 | Ma et al. |
| 2003/0153276 A1 | 8/2003 | Terry et al. |
| 2003/0171129 A1 | 9/2003 | Sagne |
| 2003/0202562 A1 | 10/2003 | Cai |
| 2004/0042492 A1 | 3/2004 | Suzuki et al. |
| 2004/0082356 A1 | 4/2004 | Walton et al. |
| 2004/0085934 A1 | 5/2004 | Balachandran et al. |
| 2004/0162075 A1 | 8/2004 | Malladi et al. |
| 2005/0018754 A1 | 1/2005 | Song |
| 2005/0053088 A1 | 3/2005 | Cheng et al. |
| 2005/0068973 A1 | 3/2005 | Taffin et al. |
| 2006/0039409 A1 | 2/2006 | Lampinen |
| 2006/0106600 A1 | 5/2006 | Bessette |
| 2007/0066362 A1 | 3/2007 | Ma et al. |
| 2008/0077837 A1 | 3/2008 | Lohr et al. |
| 2008/0137562 A1 | 6/2008 | Li et al. |
| 2008/0240022 A1 | 10/2008 | Yoon et al. |
| 2008/0247337 A1 | 10/2008 | Li et al. |

FOREIGN PATENT DOCUMENTS

| | | | |
|---|---|---|---|
| WO | 2004039011 | A2 | 5/2004 |
| WO | 2004073250 | A1 | 8/2004 |
| WO | 2004097797 | A1 | 11/2004 |

OTHER PUBLICATIONS

Das, A. et al.: Performance of hybrid ARQ for high speed downlink packet access in UMTS, Vehicular Technology Conference, 2001, VTX 2001 Fall, IEEE VTS 54th vol. 4, Oct. 7-11, 2001, pp. 2133-2137, vol. 4.

Das, A. et al.: Adaptive, asynchronous incremental redundancy (A/sup 2/IR) with fixed transmission time intervals (TTI) for HSDPA, Personal, Indoor and Mobile Radio Communications, 2002, The 13th IEEE International Symposium on vol. 3, Sep. 15-18, 2002, pp. 1083-1087, vol. 3.

3G: 3rd Generation Partnership Project 2 "3GPP2", Physical Layer Standard for cdma2000 Spread Spectrum Systems, Revision D, 3GPP2 C.S0002-D, Version 1.0 Feb. 13, 2004, pp. 3-3, 3-15, 3-21, 3-131 to 3-140.

3G: 3rdd Generation Partnership Project 2 "3GPP2", cdma2000 High Rate Packet Data Air Interface Specification, 3GPP2 C.s0024-A Version 1.0 Mar. 2004, pp. 3127 to 3-31, 13-1 to 13-13, 13-25 to 13-52.

IEEE Std 802.16-2004 (Revision of IEEE Std 802.16-2001), 806.16 IEEE Standard for Local and metropolitan area networks, Part 16: Air Interface for Fixed Broadband Wireless Access Systems, IEEE Computer Society and the IEEE Microwave Theory and Techniques Society, Oct. 1, 2004, pp. 46, 86, 427, 460, 494-505, 520-521, 548-549, 659.

Supplementary European Search Report, The Haugue, Apr. 29, 2013, all pages.

100

200

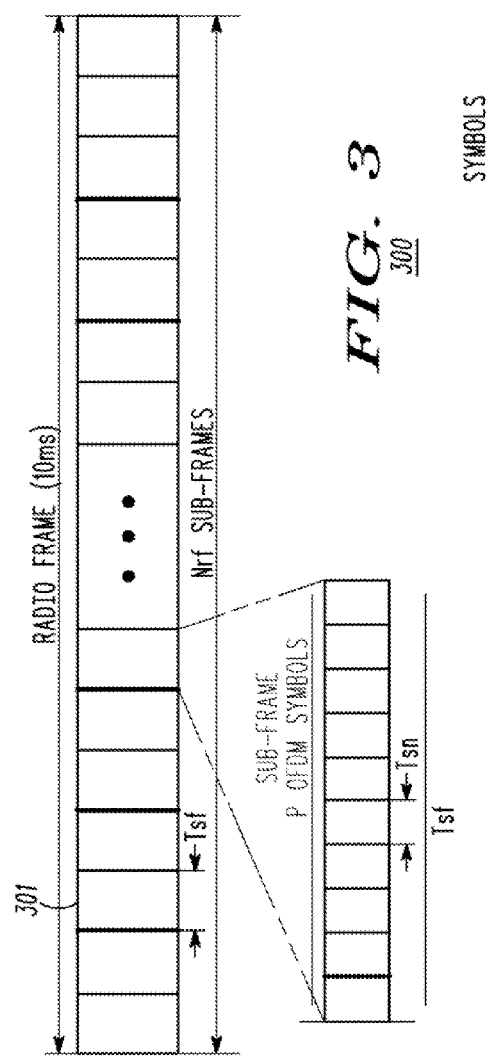
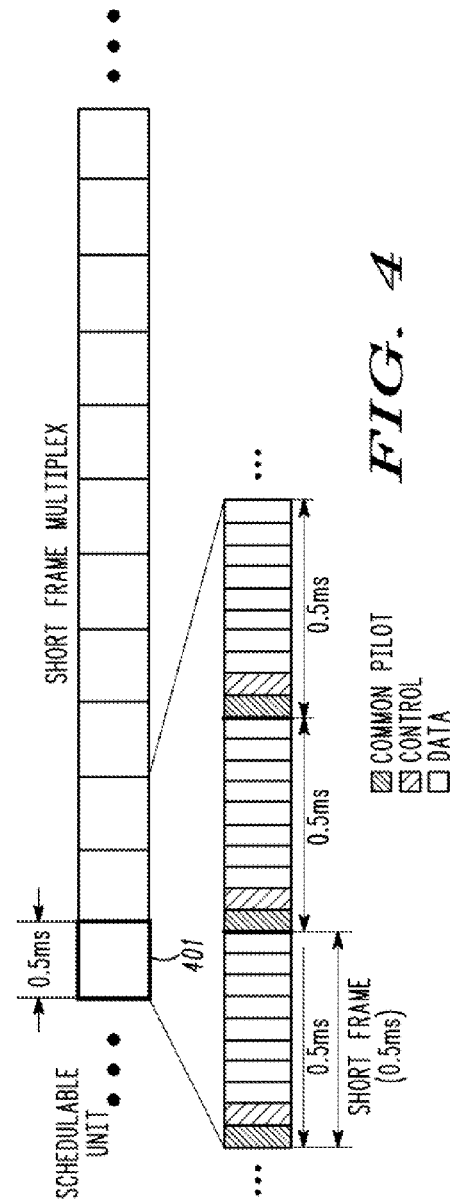
FIG. 3
FIG. 4

| PARAMETER | LONG FRAME CONFIGURATION | | | | | | | | | |
|---|---|---|---|---|---|---|---|---|---|---|
| RADIO FRAME DURATION (ms) | 10 | 10 | 10 | 10 | 10 | 10 | 10 | 10 | 10 | 10 |
| SUBFRAMES / RADIO FRAME | 20 | 20 | 20 | 18 | 18 | 16 | 16 | 16 | 15 | 15 |
| SUBFRAME DURATION (ms) | 0.5 | 0.5 | 0.5 | 0.55556 | 0.55556 | 0.625 | 0.625 | 0.625 | 0.66667 | 0.66667 |
| SUBFRAMES / LONG FRAME | 3 | 4 | 6 | 4 | 5 | 3 | 4 | 5 | 3 | 4 | 5 |
| LONG FRAME DURATION (ms) | 1.5 | 2 | 3 | 2.22222 | 2.77778 | 1.875 | 2.5 | 3.125 | 2 | 2.66667 | 3.33333 |
| OVERHEAD SUBFRAMES | 2 | 2 | 2 | 2 | 2 | 2 | 2 | 2 | 2 | 2 |
| MAX LONG / RADIO FRAME | 6 | 4 | 3 | 4 | 3 | 4 | 3 | 2 | 4 | 3 | 2 |
| MIN SHORT RADIO FRAME | 0 | 2 | 0 | 0 | 1 | 2 | 4 | 2 | 1 | 2 | 3 |

FIG. 6 EXEMPLARY LONG FRAME CONFIGURATIONS vs. SUBFRAME DURATION

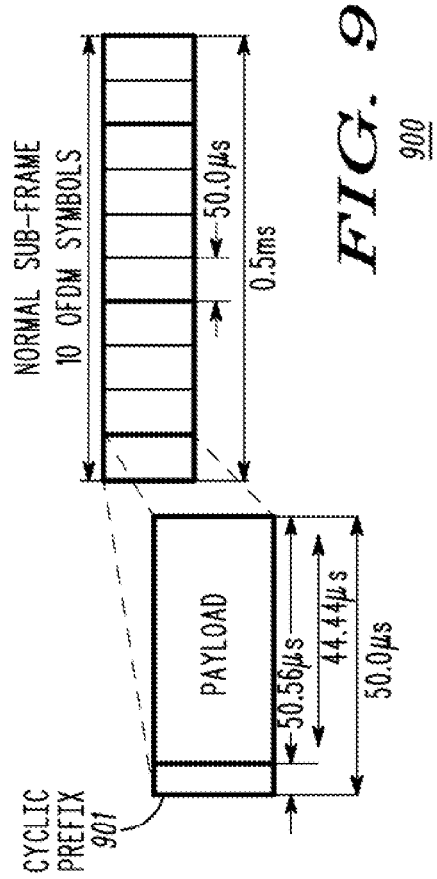
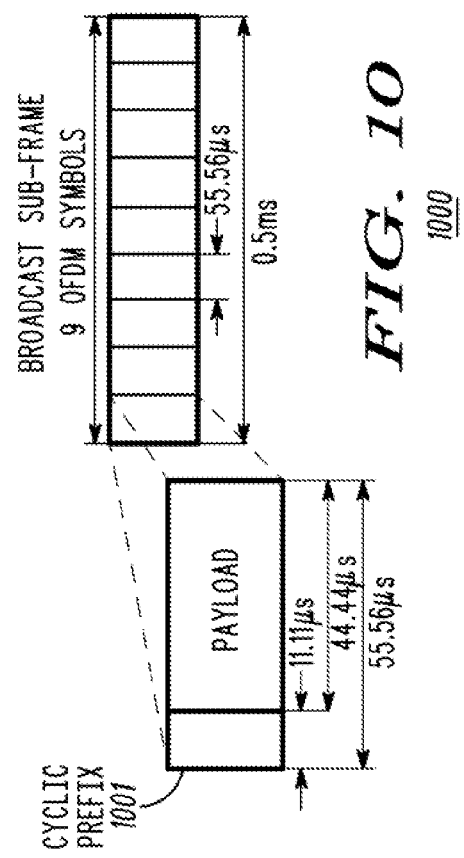

| PARAMETER | SUBFRAME CONFIGURATION | | | | | | | | | |
|---|---|---|---|---|---|---|---|---|---|---|
| RADIO FRAME DURATION (ms) | 10 | 10 | 10 | 10 | 10 | 10 | 10 | 10 | 10 | 10 |
| SUBFRAMES / RADIO FRAME | 20 | 20 | 18 | 18 | 18 | 16 | 16 | 16 | 15 | 15 |
| SUBFRAME DURATION (ms) | 0.5 | 0.5 | 0.55556 | 0.55556 | 0.55556 | 0.625 | 0.625 | 0.625 | 0.66667 | 0.66667 |
| SUBCARRIER SPACING (kHz) | 22.5 | 22.5 | 22.5 | 22.5 | 22.5 | 22.5 | 22.5 | 22.5 | 22.5 | 22.5 |
| SYMBOL DURATION (µs) | 55.5556 | 45.4545 | 50.5051 | 50.5051 | 46.2963 | 56.8182 | 56.0833 | 48.0769 | 55.5556 | 51.2821 | 47.619 |
| USEFUL (µs) | 44.44 | 44.44 | 44.44 | 44.44 | 44.44 | 44.44 | 44.44 | 44.44 | 44.44 | 44.44 | 44.44 |
| GUARD (µs) | 11.11 | 1.01 | 5.56 | 6.06 | 1.85 | 12.37 | 7.64 | 3.63 | 11.11 | 6.84 | 3.17 |
| SYMBOLS PER SUBFRAME | 9 | 10 | 11 | 11 | 12 | 11 | 12 | 13 | 12 | 13 | 14 |

TABLE 2 – EXEMPLARY SUBFRAME CONFIGURATIONS vs. THE NUMBER OF OFDM SYMBOLS PER SUBFRAME AND SUBFRAME DURATION.

| PARAMETER | SUBFRAME CONFIGURATION | | | | | | | | | |
|---|---|---|---|---|---|---|---|---|---|---|
| RADIO FRAME DURATION (ms) | 10 | 10 | 10 | 10 | 10 | 10 | 10 | 10 | 10 | 10 |
| SUBFRAMES / RADIO FRAME | 20 | 20 | 18 | 18 | 18 | 16 | 16 | 16 | 15 | 15 |
| SUBFRAME DURATION (ms) | 0.5 | 0.5 | 0.55556 | 0.55556 | 0.55556 | 0.625 | 0.625 | 0.625 | 0.66667 | 0.66667 |
| SUBCARRIER SPACING (kHz) | 25 | 25 | 25 | 25 | 25 | 25 | 25 | 25 | 25 | 25 |
| SYMBOL DURATION (µs) | 45.4545 | 41.6667 | 50.5051 | 46.2963 | 42.735 | 48.0769 | 44.6429 | 41.6667 | 47.619 | 44.4444 | 41.6667 |
| USEFUL (µs) | 40.00 | 40.00 | 40.00 | 40.00 | 40.00 | 40.00 | 40.00 | 40.00 | 40.00 | 40.00 | 40.00 |
| GUARD (µs) | 5.45 | 1.67 | 10.51 | 6.30 | 2.74 | 8.08 | 4.64 | 1.67 | 7.62 | 4.44 | 1.67 |
| SYMBOLS PER SUBFRAME | 11 | 12 | 11 | 12 | 13 | 13 | 14 | 15 | 14 | 15 | 16 |

TABLE 3 – FURTHER EXEMPLARY SUBFRAME CONFIGURATIONS vs. THE NUMBER OF OFDM SYMBOLS PER SUBFRAME AND SUBFRAME DURATION

FIG. 11

METHOD AND APPARATUS FOR REDUCING ROUND TRIP LATENCY AND OVERHEAD WITHIN A COMMUNICATION SYSTEM

RELATED APPLICATIONS

This application claims priority to U.S. Provisional Application Ser. No. 60/666,494 filed Mar. 30, 2005 and to U.S. application Ser. No. 11/276,982 filed Mar. 20, 2006, now U.S. Pat. No. 8,031,583.

FIELD OF THE INVENTION

The present invention relates generally to communication systems and in particular, to a method and apparatus for reducing round-trip latency and overhead within a communication system.

BACKGROUND OF THE INVENTION

One of the key requirements for wireless broadband system development, such as in the $3^{rd}$ generation partnership project (3GPP) Long Term Evolution (LTE), is reducing latency in order to improve user experience. From a link layer perspective, the key contributing factor to latency is the round-trip delay between a packet transmission and an acknowledgment of the packet reception. The round-trip delay is typically defined as a number of frames, where a frame is the time duration upon which scheduling is performed. The round-trip delay itself determines the overall automatic repeat request (ARQ) design, including design parameters such as the delay between a first and subsequent transmission of packets, or the number of hybrid ARQ channels (instances). A reduction in latency with the focus on defining the optimum frame duration is therefore key in developing improved user experience in future communication systems. Such systems include enhanced Evolved Universal Terrestrial Radio Access (UTRA) and Evolved Universal Terrestrial Radio Access Network (UTRAN) (also known as EUTRA and EUTRAN) within 3GPP, and evolutions of communication systems within other technical specification generating organizations (such 'Phase 2' within 3GPP2, and evolutions of IEEE 802.11, 802.16, 802.20, and 802.22).

Unfortunately, no single frame duration is best for different traffic types requiring different quality of service (QoS) characteristics or offering differing packet sizes. This is especially true when the control channel and pilot overhead in a frame is considered. For example, if the absolute control channel overhead is constant per user per resource, allocation and a single user is allocated per frame, a frame duration of 0.5 ms would be roughly four times less efficient than a frame duration of 2 ms. In addition, different frame durations could be preferred by different manufacturers or operators, making the development of an industry standard or compatible equipment difficult. Therefore, there is a need for an improved method for reducing both round-trip latency and overhead within a communication system.

BRIEF DESCRIPTION OF THE DRAWINGS

FIG. 3 is a block diagram of a radio frame.
FIG. 4 shows a sequence of consecutive short frames.
FIG. 6 shows a table for a 10 ms radio frame and subframes of approximately 0.5 ms, 0.55556 ms, 0.625 ms, and 0.67 ms.
FIG. 9 shows a subframe comprised of j=10 OFDM symbols each with a cyclic prefix 901 of 5.56 µs which may be used for unicast transmission.
FIG. 10 shows a 'broadcast' subframe comprised of j=9 symbols each with a cyclic prefix 1001 of 11.11 µs which may be used for broadcast transmission.
FIG. 11 shows a table having examples of three subframe types.

DETAILED DESCRIPTION OF THE DRAWINGS

Figure 1:
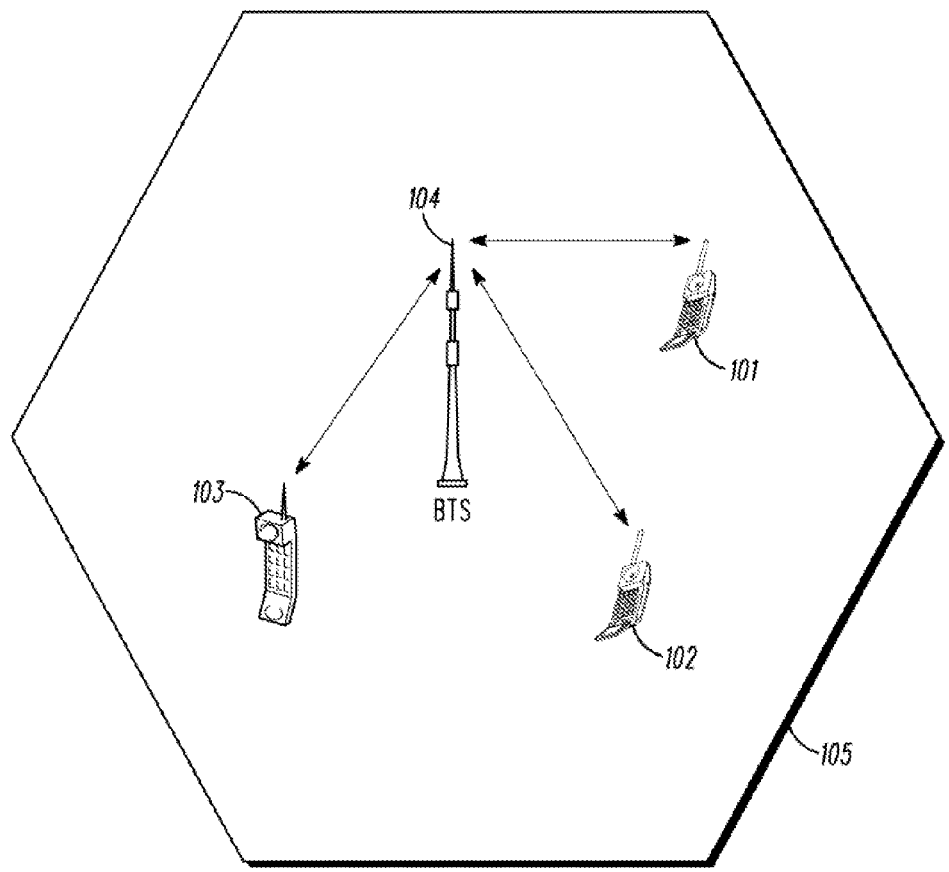
FIG. 1 is a block diagram of a communication system.

In order to address the above-mentioned need, a method and apparatus for reducing round-trip latency is provided herein. During operation radio frames are divided into a plurality of subframes. Data is transmitted over the radio frames within a plurality of subframes, and having a frame duration selected from two or more possible frame durations.

The present invention encompasses a method for reducing round-trip latency within a communication system. The method comprises the steps of receiving data to be transmitted over a radio frame, where the radio frame is comprised of a plurality of subframes. A frame duration is selected from two or more possible frame durations, where a frame is substantially equal to a multiple of subframes. The data is placed within the multiple subframes to produce multiple subframes of data, and the frame is transmitted having the multiple subframes of data over the radio frame.

The present invention additionally comprises a method comprising the steps of receiving data to be transmitted to a first user over a radio frame, where the radio frame is comprised of a plurality of subframes. A frame duration is selected for the first user from two or more possible frame durations, where a frame is substantially equal to a multiple of subframes. The data for the first user is placed within the multiple subframes to produce multiple subframes of data and then transmitted to the first user having the multiple subframes of data over the radio frame. Second data is received to be transmitted to a second user over the radio frame. A second frame duration is selected for the second user from the two or more possible frame durations, where a second frame is substantially equal to multiple of subframes. The second data for the second user is placed within the multiple subframes to produce second multiple subframes of data, and the second frame is transmitted to the second user having the second multiple subframes of data over the radio frame.

The present invention encompasses a method for transmitting data within a communication system. The method comprises the steps of receiving data to be transmitted over a radio frame, where the radio frame is comprised of a plurality of subframes. A frame length is selected comprising multiple subframes and a subframe type is selected from one of two or more types of subframes for the multiple of subframes. The data is placed within the multiple subframes to produce multiple subframes of data and the frame is transmitted having the multiple subframes of data and the subframe type over the radio frame.

The present invention encompasses a method for transmitting data within a communication system. The method comprises the steps of receiving data to be transmitted over a radio frame, where the radio frame is comprised of a plurality of subframes. A frame is selected wherein the frame is substantially equal to a multiple of subframes. The data is placed within the multiple subframes to produce multiple subframes of data and a common pilot is placed within each subframe of the multiple subframes. The frame having the multiple subframes of data is transmitted over the radio frame.

The present invention encompasses a method for transmitting data within a communication system. The method comprises the steps of determining a system bandwidth from two or more system bandwidths and receiving data to be transmitted over a radio frame and the system bandwidth. The radio frame is comprised of a plurality of subframes, and a radio frame duration and a subframe duration is based on the system bandwidth. A frame is selected, where a frame is substantially equal to a multiple of subframes. The data is placed within the multiple subframes to produce multiple subframes of data and the frame is transmitted having the multiple subframes of data and the subframe type over the radio frame.

A method for transmitting data within a communication system. The method comprises the steps of determining a carrier bandwidth and receiving data to be transmitted over a radio frame, where the radio frame is comprised of a plurality of subframes. A frame is selected, where the frame is substantially equal to a multiple of subframes and each subframe is comprised of resource elements, where a resource element comprises multiples of sub-carriers such that a carrier bandwidth is divided into a number of resource elements. The data is placed within the multiple subframes to produce multiple subframes of data and the frame is transmitted having the multiple subframes of data and the subframe type over the radio frame.

Turning now to the drawings, wherein like numerals designate like components, FIG. 1 is a block diagram of communication system 100. Communication system 100 comprises a plurality of cells 105 (only one shown) each having a base transceiver station (BTS, or base station) 104 in communication with a plurality of remote, or mobile units 101-103. In the preferred embodiment of the present invention, communication system 100 utilizes a next generation Orthogonal Frequency Division Multiplexed (OFDM) or multicarrier based architecture, such as OFDM with or without cyclic prefix or guard interval (e.g., conventional OFDM with cyclic prefix or guard interval, OFDM with pulse shaping and no cyclic prefix or guard interval (OFDM/OQAM with IOTA (Isotropic Orthogonal Transform Algorithm) prototype filter), or single carrier with or without cyclic prefix or guard interval (e.g., IFDMA, DFT-Spread-OFDM), or other. The data transmission may be a downlink transmission or an uplink transmission. The transmission scheme may include Adaptive Modulation and Coding (AMC). The architecture may also include the use of spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. However, in alternate embodiments communication system 100 may utilize other wideband cellular communication system protocols such as, but not limited to, TDMA or direct sequence CDMA.

In addition to OFDM, communication system 100 utilizes Adaptive Modulation and Coding (AMC). With AMC, the modulation and coding format of a transmitted data stream for a particular receiver is changed to predominantly match a current received signal quality (at the receiver) for the particular frame being transmitted. The modulation and coding scheme may change on a frame-by-frame basis in order to track the channel quality variations that occur in mobile communication systems. Thus, streams with high quality are typically assigned higher order modulations rates and/or higher channel coding rates with the modulation order and/or the code rate decreasing as quality decreases. For those receivers experiencing high quality, modulation schemes such as 16 QAM, 64 QAM or 256 QAM are utilized, while for those experiencing low quality, modulation schemes such as BPSK or QPSK are utilized.

Multiple coding rates may be available for each modulation scheme to provide finer AMC granularity, to enable a closer match between the quality and the transmitted signal characteristics (e.g., R=¼, ½, and ¾ for QPSK; R=½ and R=⅔ for 16 QAM, etc.). Note that AMC can be performed in the time dimension (e.g., updating the modulation/coding every $N_t$ OFDM symbol periods) or in the frequency dimension (e.g., updating the modulation/coding every $N_{sc}$ subcarriers) or a combination of both.

The selected modulation and coding may only predominantly match the current received signal quality for reasons such as channel quality measurement delay or errors or channel quality reporting delay. Such latency is typically caused by the round-trip delay between a packet transmission and an acknowledgment of the packet reception.

In order to reduce latency, a Radio Frame (RAF) and subframe are defined such that the RAF is divided into a number (an integer number in the preferred embodiment) of subframes. Within a radio frame, frames are constructed from an integer number of subframes for data transmission, with two or more frame durations available (e.g., a first frame duration of one subframe, and a second frame duration of three subframes).

For example, a 10 ms core radio frame structure from UTRA may be defined, with $N_{rf}$ subframes per radio frame (e.g., $N_{rf}$=20 $T_{sf}$=0.5 ms subframes, where $T_{sf}$=duration of one subframe). For OFDM transmission, subframes comprise an integer number P of OFDM symbol intervals (e.g., P=10 for $T_{sn}$=50 us symbols, where $T_{sn}$=duration of one OFDM symbol), and one or more subframe types may be defined based on guard interval or cyclic prefix (e.g., normal or broadcast).

As one of ordinary skill in the art will recognize, a frame is associated with a scheduled data transmission. A frame may be defined as a resource that is 'schedulable', or a schedulable unit, in that it has an associated control structure—possibly uniquely associated—that controls the usage of the resource (i.e. allocation to users etc.). For example, when a user is to be scheduled on a frame, a resource allocation message corresponding to a frame will provide resources (e.g., for an OFDM system a number of modulation symbols each of one subcarrier on one OFDM symbol) in the frame for transmission. Acknowledgements of data transmissions on a frame will be returned, and new data or a retransmission of data may be scheduled in a future frame. Because not all resources in a frame may be allocated in a resource allocation (such as in an OFDM system), the resource allocation may not span the entire available bandwidth and/or time resources in a frame.

The different frame durations may be used to reduce latency and overhead based on the type of traffic served. For example, if a first transmission and a retransmission are required to reliably receive a voice over internet protocol (VoIP) data packet, and a retransmission can only occur after a one frame delay, allocating resources within a 0.5 ms frame instead of a 2 ms frame reduces latency for reliable reception from 6 ms (transmission, idle frame, retransmission) to 1.5 ms. In another example, providing a resource allocation that will fit a user's packet without fragmentation, such as a 1 ms frame instead of a 0.5 ms frame, can reduce overhead such as control and acknowledgement signaling for multiple fragments of a packet.

Other names reflecting the aggregation of resources such as consecutive OFDM symbols may be used instead of subframe, frame, and radio frame. For example, the term 'slot' may be used for 'subframe', or 'transmission time interval (TTI)' used for 'frame' or 'frame duration'. In addition, a frame may be considered a user transmission specific quantity (such as a TTI associated with a user and a data flow), and frames therefore need not be synchronized or aligned between users or even transmissions from the same user (e.g., one subframe could contain parts of two data transmissions from a user, the first transmitted in a one subframe frame and the second transmitted in a four subframe frame). Of course, it may be advantageous to restrict either transmissions with a user or transmissions with multiple users to have synchronized or aligned frames, such as when time is divided into a sequence of 0.5 ms or 2 ms frames and all resource allocations must be within these frames. As indicated above a radio frame can represent an aggregation of subframes or frames of different sizes or an aggregation of resources such as consecutive OFDM or DFT-SOFDM symbols exceeding the number of such symbols in a subframe where each symbol is composed of some number of subcarriers depending on the carrier bandwidth.

The radio frame structure may additionally be used to define common control channels for downlink (DL) transmissions (such as broadcast channels, paging channels, synchronization channels, and/or indication channels) in a manner which is time-division multiplexed into the subframe sequence, which may simplify processing or increase battery life at the user equipment (remote unit). Similarly for uplink (UL) transmissions, the radio frame structure may additionally be used to define contention channels (e.g. random, access channel_(RACH)), control channels including pilot time multiplexed with the shared data channel.

Figure 2:
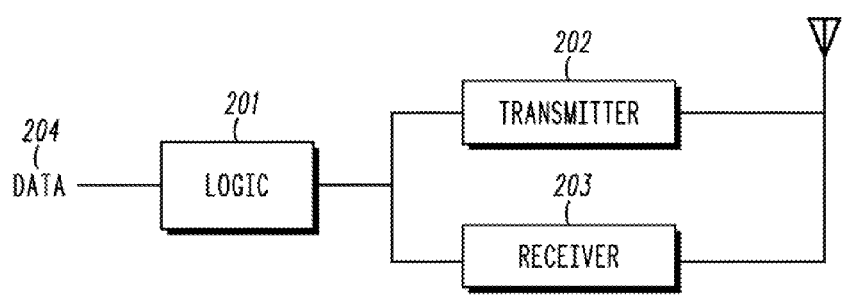
FIG. 2 is a block diagram of circuitry used to perform uplink and downlink transmission.

FIG. 2 is a block diagram of circuitry 200 for base station 104 or mobile station 101-103 to perform uplink and downlink transmission. As shown, circuitry 200 comprises logic circuitry 201, transmit circuitry 202, and receive circuitry 203. Logic circuitry 200 preferably comprises a microprocessor controller, such as, but not limited to a Freescale PowerPC microprocessor. Transmit and receive circuitry 202-203 are common circuitry known in the art for communication utilizing a well known network protocols, and serve as means for transmitting and receiving messages. For example, transmitter 202 and receiver 203 are preferably well known transmitters and receivers that utilize a 3GPP network protocol. Other possible transmitters and receivers include, but are not limited to transceivers utilizing Bluetooth, IEEE 802.16, or HyperLAN protocols.

During operation, transmitter 203 and receiver 204 transmit and receive frames of data and control information as discussed above. More particularly, data transmission takes place by receiving data to be transmitted over a radio frame. The radio frame (shown in FIG. 3) is comprised of a plurality of subframes 300 (only one labeled) wherein the duration of subframe 301 is substantially constant and the duration of the radio frame 300 is constant. For example only, a radio frame comprises m=20 subframes 300 of duration 0.5 ms consisting of j=10 symbols. During transmission, logic circuitry 201 selects a frame duration from two or more frame durations, where the frame duration is substantially the subframe duration multiplied by a number. Based on the frame duration, the number of subframes are grouped into the frame and data is placed within the subframes. Transmission takes place by transmitter 202 transmitting the frame 300 having the number of subframes over the radio frame.

As noted previously, the data transmission may be a downlink transmission or an uplink transmission. The transmission scheme may be OFDM with or without cyclic prefix or guard interval (e.g., conventional OFDM with cyclic prefix or guard interval, OFDM with pulse shaping and no cyclic prefix or guard interval (OFDM/OQAM with IOTA (Isotropic Orthogonal Transform Algorithm) prototype filter), or single carrier with or without cyclic prefix or guard interval (e.g., IFDMA, DFT-Spread-OFDM), CDM, or other.

Frame Durations

Figure 5:
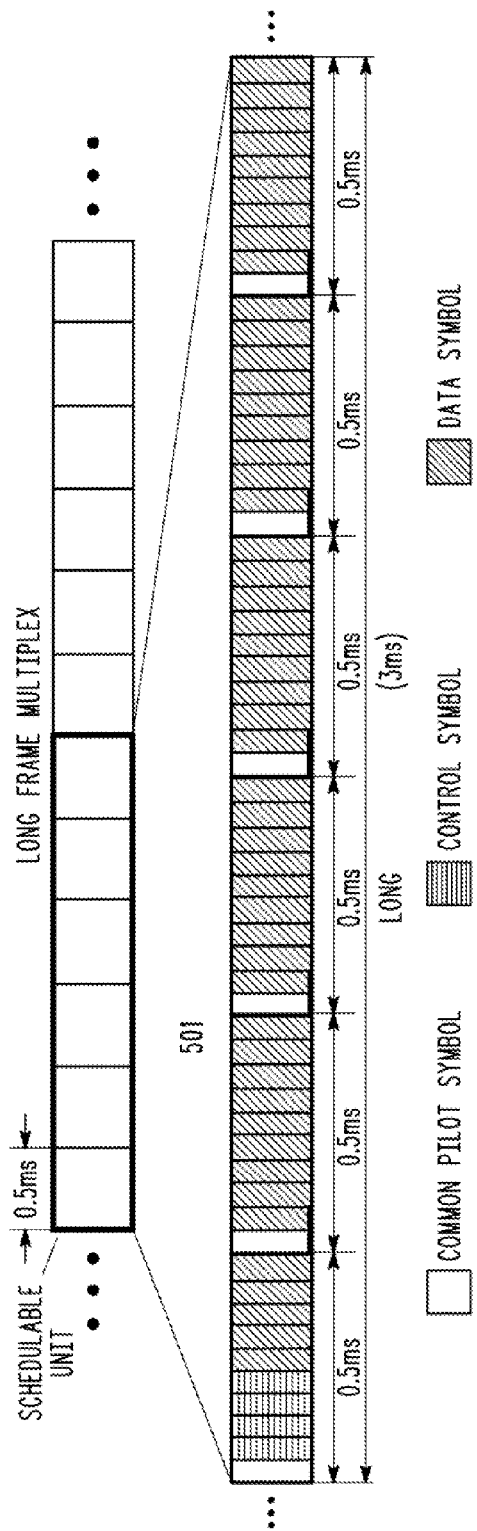
FIG. 5 shows a sequence of consecutive long frames.

There are two or more frame durations. If two frame durations are defined, they may be designated short and long, where the short frame duration comprises fewer subframes than the long frame duration. FIG. 4 shows a sequence of consecutive short frames 401 (short frame multiplex), and FIG. 5 shows a sequence of consecutive long frames 501 (long frame multiplex). Time may be divided into a sequence of subframes, subframes grouped into frames of two or more durations, and frame duration may be different between consecutive frames. Subframes of a frame are of a subframe type, with typically two or more subframe types. Each short and long frame is a schedulable unit composed of ns (n) subframes. In the example of FIG. 4 and FIG. 5, a subframe is of duration 0.5 ms and 10 symbols, ns=1 for the short frame 401 while n=6'(3 ms) for the long frame 501, although other values may be used. A radio frame need not be defined, or, if defined, the frame (e.g., short or long frame) may span more than one radio frame. As an example, a common pilot or common reference symbol or common reference signal is time division multiplexed (TDM) onto the first symbol of each subframe, and control symbols are TDM onto the first symbols of each frame (other forms of multiplexing such as FDM, CDM, and combinations may also be used). Pilot symbols and resource allocation control configurations will be discussed in later sections—the intent here is to show that the control overhead for a long frame may be less than for a short frame.

A radio frame (radio frame) can include short frames 401, long frames 501, or some combination of short and long frames. A single user may have both short frames and long frames within a radio frame, or may be restricted to one frame duration. Multiple users' frames may be synchronous or aligned, or may be asynchronous or not aligned. In general, a frame (e.g., short or long frame) may span more than one radio frame. Several different long frame configurations are shown in Table 1 of FIG. 6 below for a 10 ms radio frame and subframes of approximately 0.5 ms, 0.55556 ms, 0.625 ms, and 0.67 ms. In this example, the short frame duration is one subframe, and the long frame duration is varied. The maximum number of long frames per radio frame is shown for each configuration, as well as the minimum number of short frames per radio frame. An optional radio frame overhead (in subframes) is assumed (e.g., for the common control channels mentioned earlier), as will be discussed in the Radio Frame Overhead Multiplexing section. However, radio frame and other overheads may also be multiplexed within frames (data subframes). For simplicity and flexibility, it is preferred but not required that the radio frame overhead be an integer number of subframes.

Figure 7:
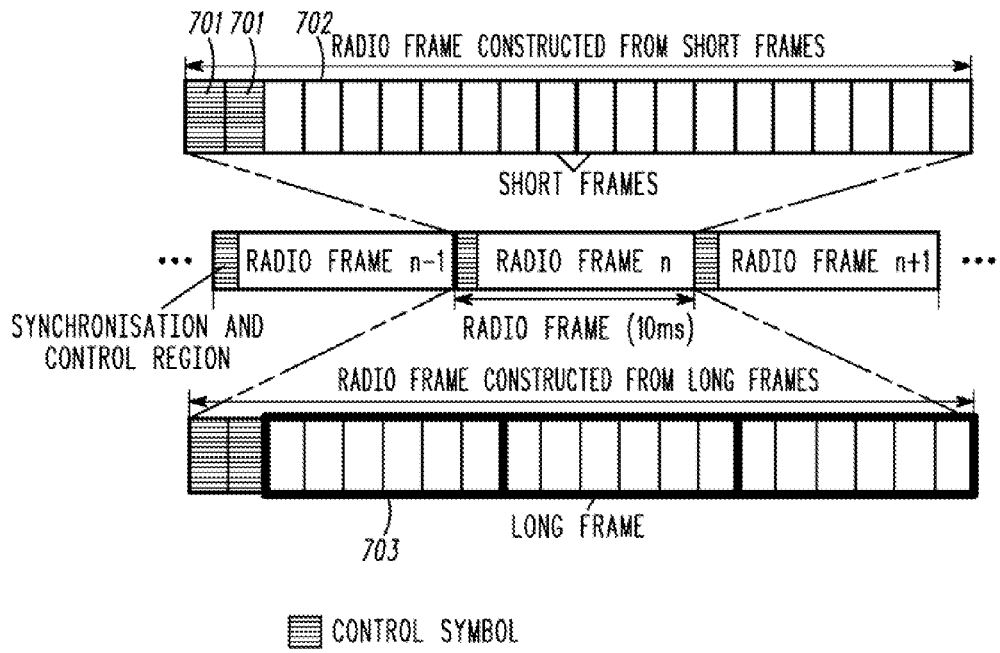
FIG. 7 shows examples for the third data column of Table 1, with 0.5 ms subframes and 6 subframes per long frame (3 ms).

FIG. 7 shows examples for the third data column of Table 1, with 0.5 ms subframes and 6 subframes per long frame (3 ms). In the example of FIG. 7, the radio frame starts with two synchronization and control subframes (radio frame overhead) 701 followed either by 18 short frames 702 (only one labeled) or 3 long frames 703 (only one labeled) where each long frame is composed of 6 subframes. An additional (optional) parameter in this example is the minimum number of short frames per radio frame (the last row of the table). This parameter determines whether a radio frame must contain some short frames. By setting the minimum number of short frames per radio frame to zero, the radio frame is allowed to be filled completely with long frames and no short frames. Because the minimum number of short frames per radio frame is zero, a mix of short and long frames (in general permitted) may be prohibited in a radio frame.

Figure 8:
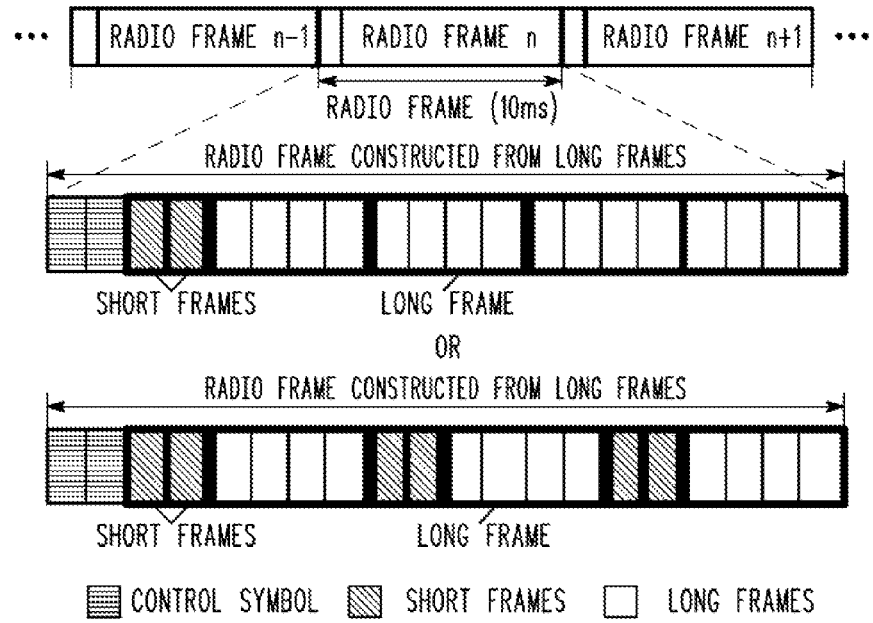
FIG. 8 shows two examples of radio frames based on a combination of 2 ms long frames and 0.5 ms short frames.

Alternatively, Table 1 also shows the table entry with 0.5 ms subframes and 4 subframes per long frame (2 ms). FIG. 8 shows two examples of radio frames based on a combination of 2 ms long frames and 0.5 ms short frames. The possible starting locations for long frames may be restricted to known positions within the radio frame.

Reasons for Selecting a Particular Frame Durations

As an example, a frame duration may be selected based in part on:

Particular hardware that favors a frame duration, including the capability of the user equipment.

Operator or manufacturer preference, which may include (among other factors) deployment preference or available spectrum and adjacency to other deployed wireless systems Channel bandwidth (such as 1.25 MHz or 10 MHz), A user condition from one or more users, where the user condition may be speed (Doppler), radio channel condition, user location in the cell (e.g., edge-of-cell), or other user condition.

A user traffic characteristic for one or more users, such as latency requirement, packet size, error rate, allowable number of retransmissions etc.

A frame duration may be selected based in part on minimizing overhead for one or more users. Overhead may be control overhead, fragmentation overhead (e.g., CRCs), or other overhead.

Number of users to be scheduled in a frame

The radio network state, including the system 'load' and the number of users in each cell.

Backward compatibility with legacy systems

Frequency and modulation partitioning of a carrier and assigned traffic types: Overall carrier may be split into two or more bands of different sizes with different modulation types used in each band (for example carrier bandwidth is split into a CDMA or single carrier or spread OFDM band and a multi-carrier OFDM band) such that different frame sizes are better or (near) optimal to the assigned or scheduled traffic type in each band (e.g. VoIP in the CDMA band and Web Browsing in the other OFDM band)

As an example, consider selecting a frame duration for a single user between a short frame (e.g., a frame of duration less than the maximum number of subframes) and a long frame (e.g., a frame of duration more than the minimum number of subframes). A short frame may be selected for lowest latency, smallest packets, medium Doppler, large bandwidth, or other reasons. A long frame may be selected for lower overhead, low latency, larger packets, low or high Doppler, edge-of-cell, small bandwidth, multi-user scheduling, frequency selective scheduling, or other reasons. In general, no hard-and-fast rules need be applied, however, so any latency, packet size, bandwidth, Doppler, location, scheduling method, etc. may be used in any frame duration (short or long). For example, the subframe duration may correspond to the minimum downlink frame or TTI. The concatenation of multiple subframes into a longer frame or TTI may e.g. provide improved support for lower data rates and QoS optimization.

The frame duration may be selected on any of a number of granularities. The frame duration or TTI can either be a semi-static or dynamic transport channel attribute. As such, the frame duration or TTI may be determined on a frame-by-frame (and therefore dynamic) basis, or on a semi-static basis. In case of a dynamic basis, the Network (node B) would signal the frame duration either explicitly (e.g., with L1 bits) or implicitly (e.g., by indicating modulation and coding rate and transport block size). In case of a semi-static frame duration or TTI, the frame duration or TTI may be set through higher layer (e.g., L3) signaling. Granularities include but are not limited to frame-by-frame basis, within a radio frame, between radio frame, every multiple of radio frame (10, 20, 100, etc.), every number of ms or s (e.g., 115 ms, 1 s, etc.), upon handover, system registration, system deployment, on receiving a L3 message, etc. The granularities may be termed static, semi-static, semi-dynamic, dynamic, or other terms. The frame duration or TTI may also be triggered on a change in any of the above 'selection' characteristics, or for any other reason.

Subframe Type

In the downlink and the uplink there is at least one type of subframe, and typically for the downlink (and sometimes for the uplink) there are usually two or more types of subframes (each with substantially the same duration). For example, the types may be 'normal' and 'broadcast' (for downlink transmission), or types A, B, and C etc. In this case, the data transmission procedure is expanded to include:

Receiving data to be transmitted over a radio frame, wherein the radio frame is comprised of a plurality of subframes wherein the duration of a subframe is substantially constant and the duration of the radio frame is constant;

Selecting a frame duration from two or more frame durations, wherein the frame duration is substantially the subframe duration multiplied by a number;

Based on the frame duration, grouping into a frame the number of subframes

Selecting a subframe type, wherein the type of subframe selected dictates an amount of data that can fit within a subframe Placing the data within the subframes of the subframe type Transmitting the frame having the number of subframes over the radio frame.

As indicated, all subframes in a frame have the same type, though in general subframe types may be mixed in a frame.

The subframe type may be distinguished by a transmission parameter. For an OFDM transmission, this may include guard interval duration, subcarrier spacing, number of subcarriers, or FFT size. In a preferred embodiment, the subframe type may be distinguished by the guard interval (or cyclic prefix) of a transmission. In the examples such a transmission is referred to as an OFDM transmission, though as is known in the art a guard interval may also be applied to a single carrier (e.g., IFDMA) or spread (e.g., CDMA) signal. A longer guard interval could be used for deployment with larger cells, broadcast or multicast transmission, to relax synchronization requirements, or for uplink transmissions.

As an example, consider an OFDM system with a 22.5 kHz subcarrier spacing and a 44.44 μs (non-extended) symbol duration. FIG. 9 shows subframe 900 comprised of j=10 OFDM symbols each with a cyclic prefix 901 of 5.56 μs which may be used for unicast transmission. FIG. 10 shows 'broadcast' subframe 1000 comprised of j=9 symbols each with a cyclic prefix 1001 of 11.11 μs which may be used for broadcast transmission. In the figures the use of the symbols in a subframe are not shown (e.g., data, pilot, control, or other functions). As is evident, cyclic prefix 1001 for broadcast subframes is larger (in time) than cyclic prefix 901 for unicast (non-multicast or broadcast) subframes. Frames can thus be identified as short or long by their cyclic prefix length. Of course, subframes with a longer CP may be used for unicast and subframes with a shorter CP may be used for broadcast, so designations such as subframe type A or B are appropriate.

Examples of three subframe types are provided in Table 2 shown in FIG. 11 below for 22.5 kHz subcarrier spacing and subframes of approximately 0.5, 0.5556, 0.625, and 0.6667 ms. Three cyclic prefix durations (for subframe types A, B, and C) are shown for each subframe duration. Other subcarrier spacings may also be defined, such as but not restricted to 7-8 kHz, 12-13 Hz, 15 kHz, 17-18 kHz. Also, in a subframe all the symbols may not be of the same symbol duration due to different guard durations (cyclic prefix) or different sub-carrier spacings or FFT size.

The OFDM numerology used is exemplary only and many others are possible. For example, the Table 3 shown in FIG. 11 uses a 25 kHz subcarrier spacing. As shown in this example (e.g., 0.5 ms subframe, 5.45 us guard interval), there may be a non-uniform duration of guard intervals within a subframe, such as when the desired number of symbols does not evenly divide the number of samples per subframe. In this case, the table entry represents an average cyclic prefix for the symbols of the subframe. An example of how to modify the cyclic prefix per subframe symbol is shown in the Scalable Bandwidth section.

Figure 12:
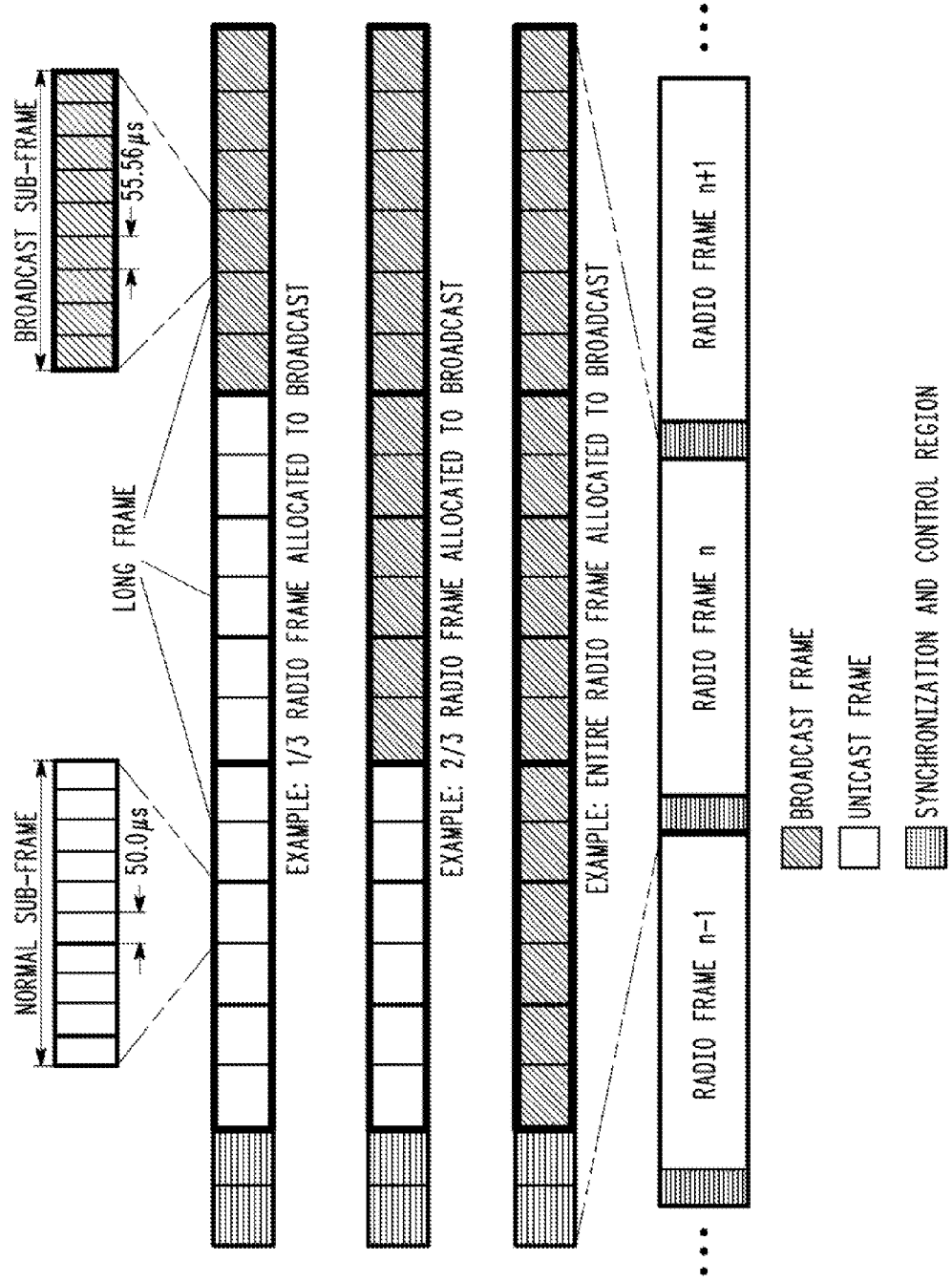
FIG. 12 shows a long frame composed entirely of broadcast subframes or composed entirely of normal (unicast) subframes.
Figure 13:
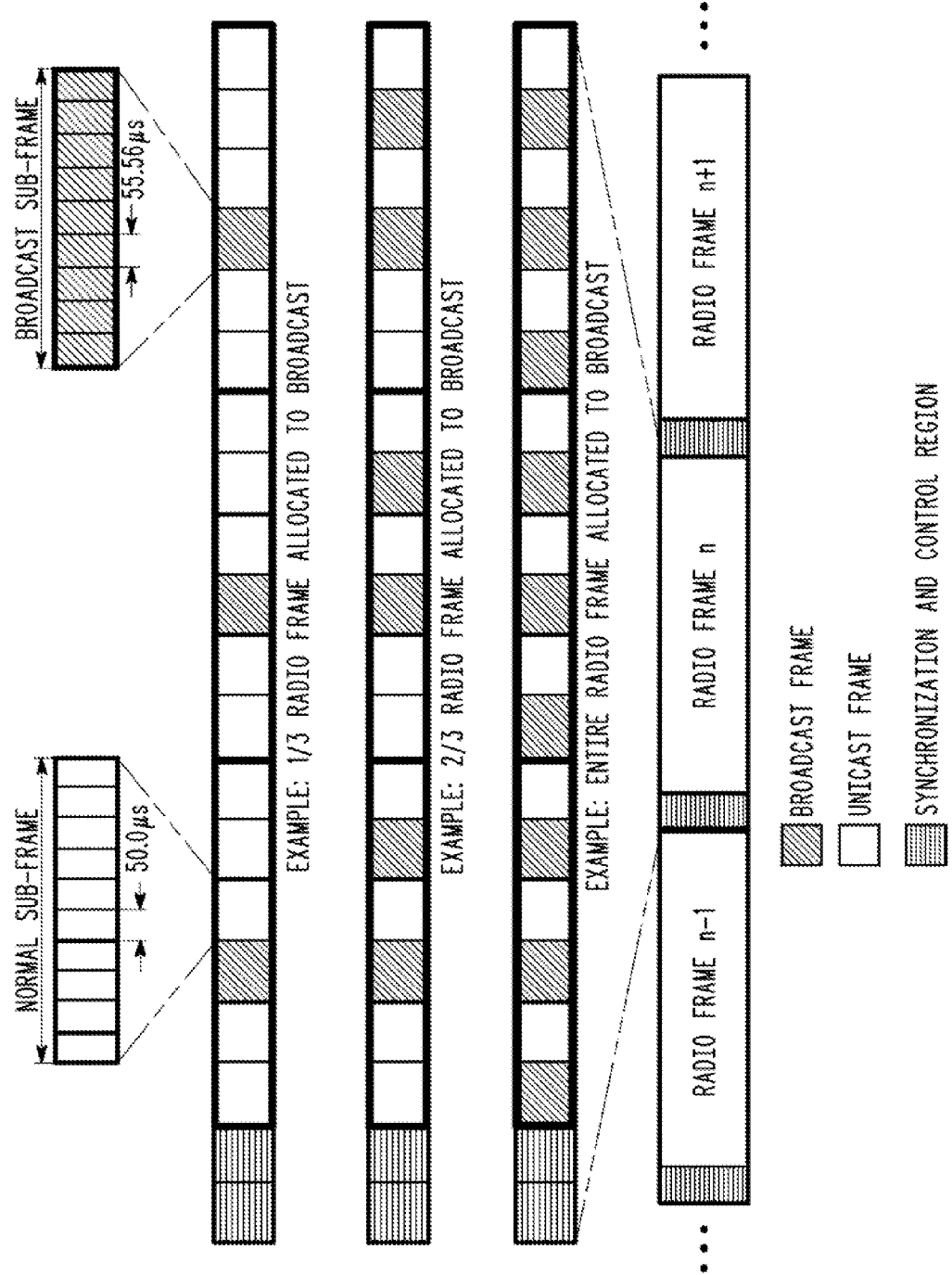
FIG. 13 shows a short frame composed of either a normal or a broadcast subframe and one or more broadcast type short frames.

A long frame may be composed entirely of broadcast subframes or composed entirely of normal (unicast) subframes (see FIG. 12) or a combination of normal and broadcast subframes. One or more broadcast type long frames can occur within a radio frame. A short frame may also be composed of either a normal or a broadcast subframe and one or more broadcast type short frames can occur in a radio frame (see FIG. 13). Broadcast frames may be grouped with other broadcast frames to improve channel estimation for the unicast and non-unicast data (see Pilot Symbols section; common pilots may be used from adjacent subframes), and/or broadcast frames may be interspaced with non-broadcast frames for time interleaving. Though not shown, at least one additional subframe type may be of type 'blank'. A blank subframe may be empty or contain a fixed or pseudo-randomly generated payload. A blank subframe may be used for interference avoidance, interference measurements, or when data is not present in a frame in a radio frame. Other subframe types may also be defined.

Radio Frame Ancillary Function Multiplexing

A part of a radio frame may be reserved for ancillary functions. Ancillary functions may comprise radio frame control (including common control structures), synchronization fields or sequences, indicators signaling a response to activity on a complementary radio channel (such as an FDD carrier pair companion frequency), or other overhead types.

Figure 14:
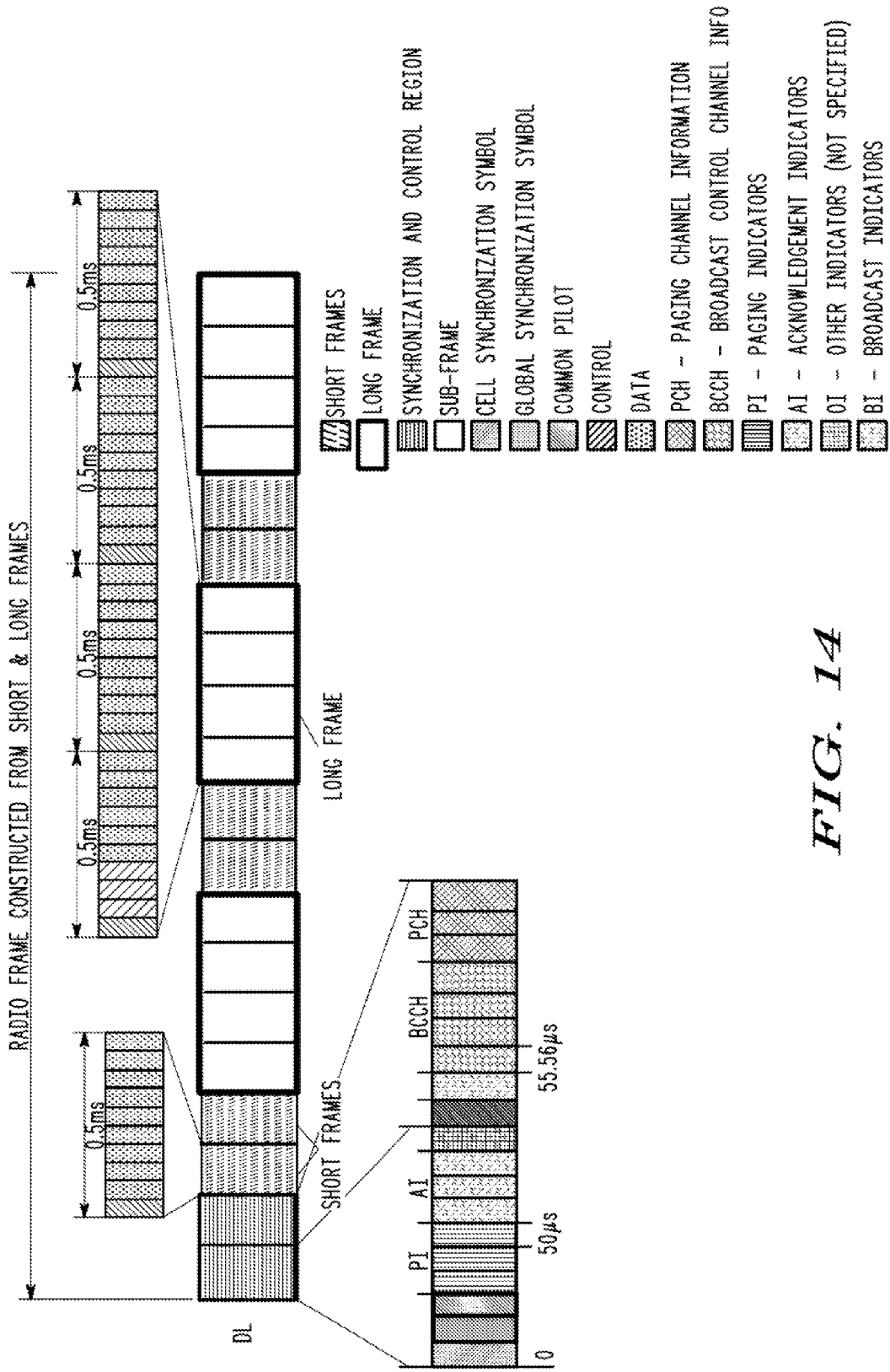
FIG. 14 shows an example of the radio frame overhead.

In FIG. 14 one example of the radio frame overhead called "synchronization and control region" is illustrated. In this example, the overhead is 2 subframes time-multiplexed in a 20 subframe radio frame. Other forms of multiplexing synchronization and control within subframes are also possible. The synchronization and control region may include synchronization symbols of various types (including a cell-specific Cell Synchronization Symbol (CSS), a Global Synchronization Symbol (GSS) shared between 2 or more network edge nodes), common pilot symbols (CPS), paging indicator channel symbols (PI), acknowledgement indicator channel symbols (AI), other indicator channel (OI), broadcast indicator channel (BI), broadcast control channel information (BCCH), and paging channel information (PCH). These channels commonly occur within cellular communication systems, and may either have different names or not be present in some systems. In addition, other control and synchronization channels may exist and be transmitted during this region.

Figure 15:
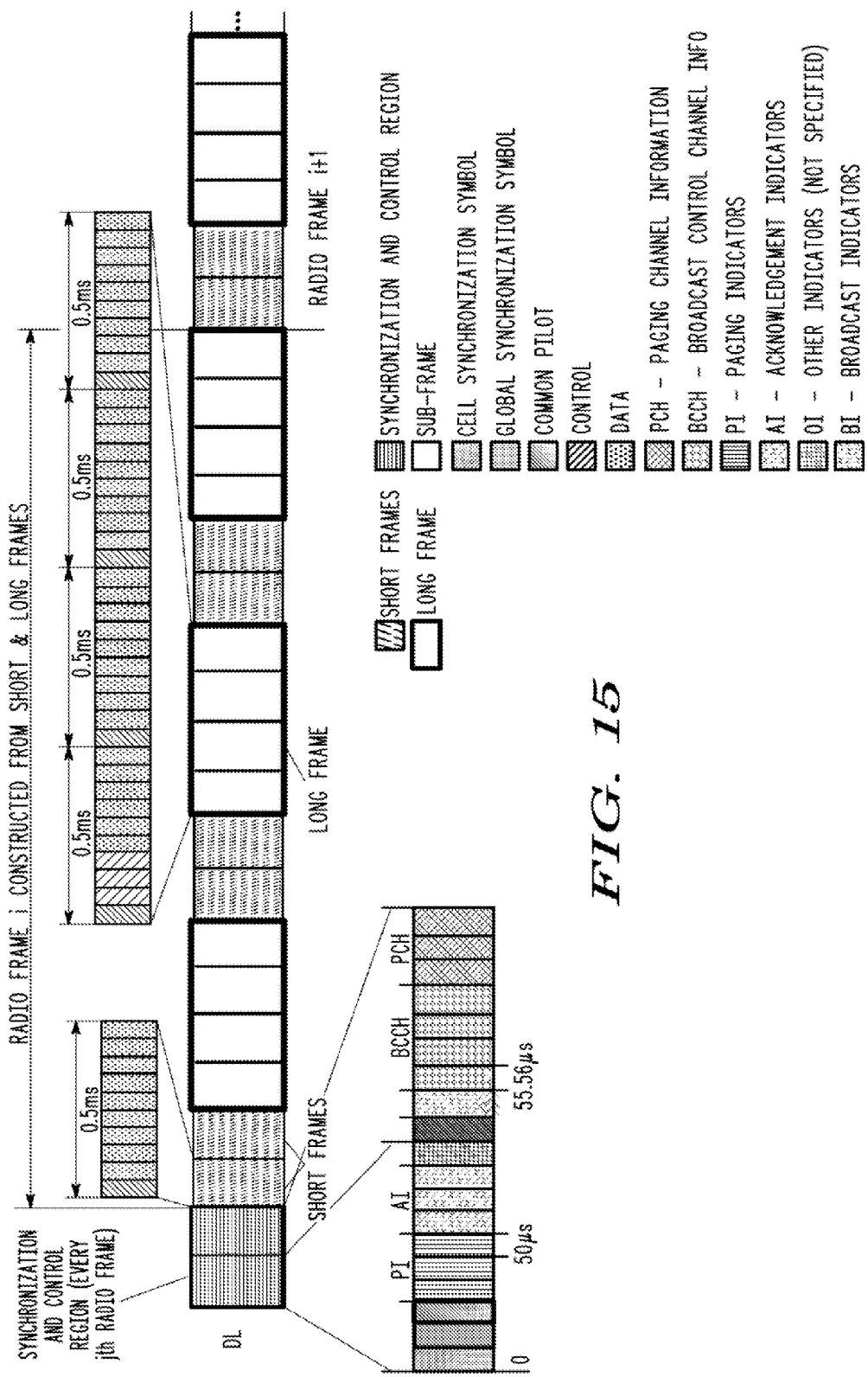
FIG. 15 shows an alternate Radio Frame structure of arbitrary size where the synchronization and control (S+C) region is not part of a radio frame but part of a larger hierarchical frame structure composed of radio frames where the (S+C) region is sent with every j Radio Frames.

FIG. 15 shows an alternate Radio Frame structure of arbitrary size where the synchronization and control (S+C) region is not part of a radio frame but part of a larger hierarchical frame structure composed of radio frames where the (S+C) region is sent with every j Radio Frames. The radio frame following the S+C region is 18 subframes in this example.

Figure 16:
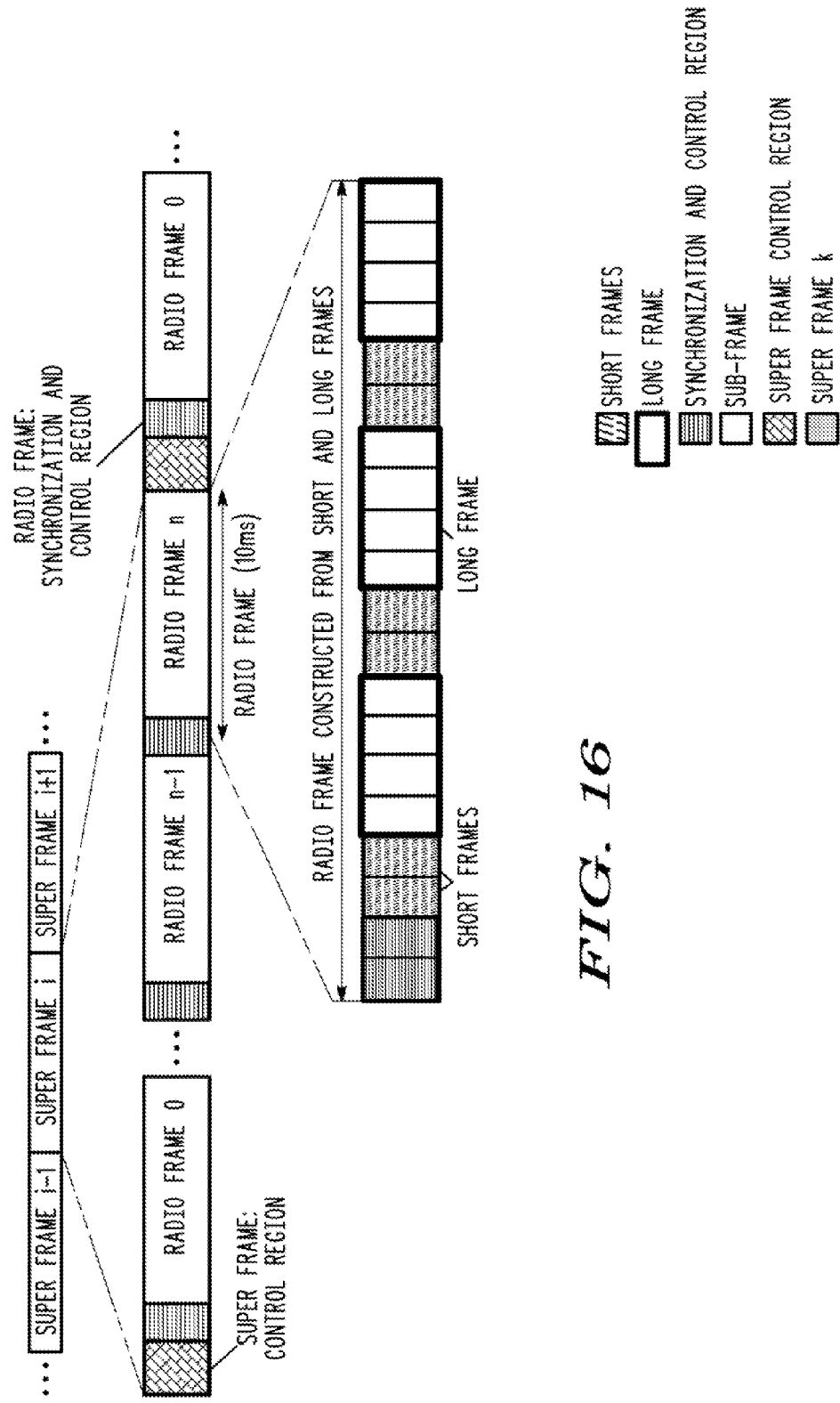
FIG. 16 and FIG. 17 illustrate a hierarchical frame structure where a Super frame is defined to be composed of n+1 radio frames.
Figure 17:
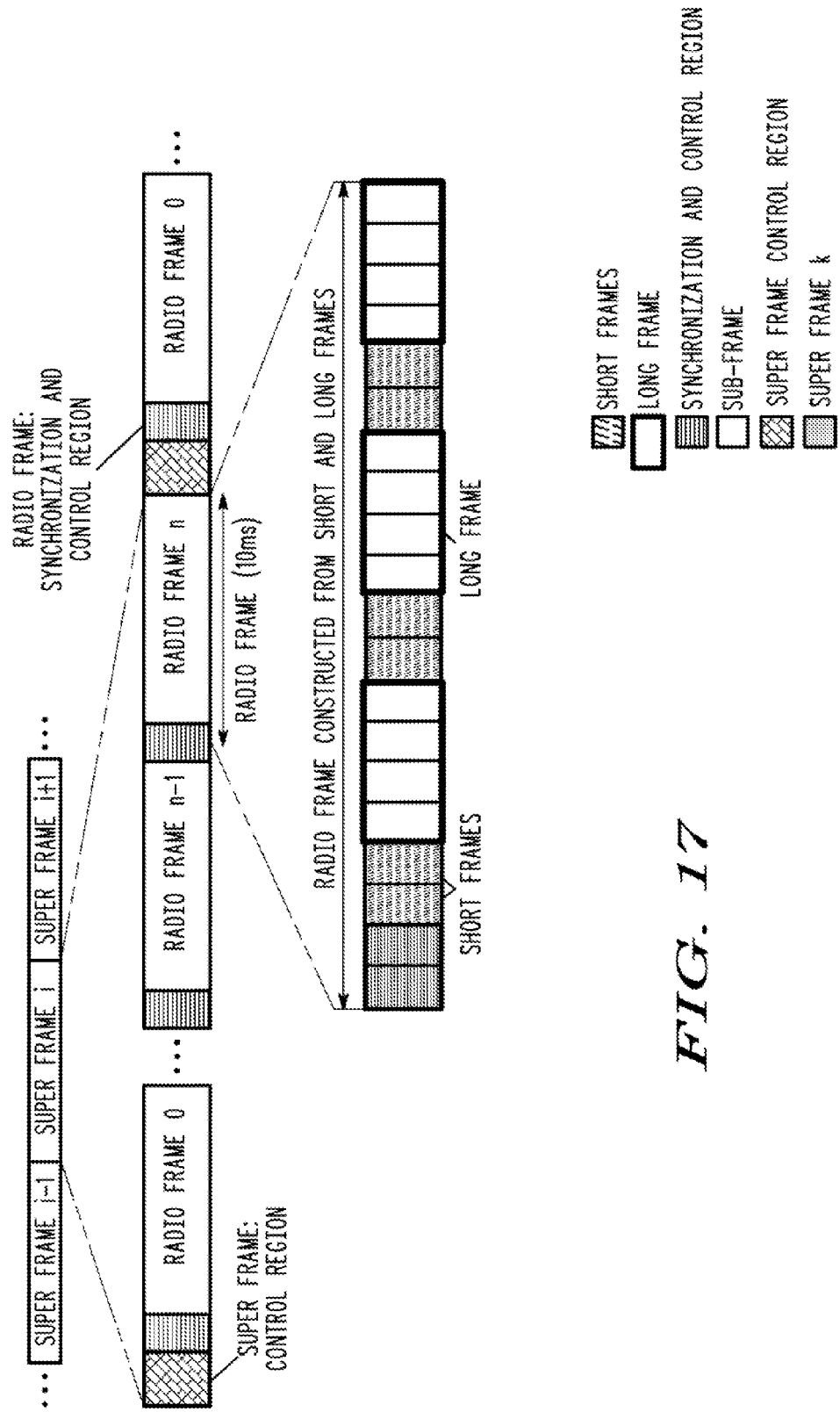

FIG. 16 and FIG. 17 illustrate a hierarchical frame structure where a Super frame is defined to be composed of n+1 radio frames. In FIG. 16 the radio frame and the Super frame each have a control and synchronization and control region respectively while in FIG. 17 only the super frame includes a control region. The radio frame control and synchronization regions can be of the same type or can be different for different radio frame locations in the Super frame.

The synchronization and control part of a radio frame may be all or part of one or more subframes, and may be a fixed duration. It may also vary between radio frames depending on the hierarchical structure in which the radio frame sequence is embedded. For example, as shown in the FIG. 16, it may comprise the first two subframes of each radio frame. In general, when synchronization and/or control is present in all or part of multiple subframes, said multiple subframes do not need to be directly adjacent to each other. In another example, it may comprise two subframes in one radio frame and three subframes in another radio frame. The radio frame with additional subframe(s) of overhead may occur infrequently, and the additional overhead may occur in subframes adjacent or non-adjacent to the normal (frequent) radio frame overhead. In an alternate embodiment, the overhead may be in a radio frame but may not be an integer number of subframes which may occur if the radio frame is not equally divided into subframes but instead an overhead region plus an integer number of subframes. For example, a 10 ms radio frame may consist of 10 subframes, each having a length of 0.9 ms, plus a 1 ms portion for radio frame overhead (e.g., radio frame paging or broadcast channels).

As will be discussed below, the synchronization and control part of all or some radio frames radio frame may be (but is not required to be) configured to convey information about the layout of the radio frame, such as a map of the short/long subframe configuration (example—if the radio frame has two long frames followed by a short frame, then the configuration could be represented as L-L-S). In addition, the synchronization and control part may specify which subframes are used for broadcast, etc. Conveying the radio frame layout in this manner would reduce or potentially eliminate the need for subframe-by-subframe blind detection of the frame layout and usage, or the delivery of a radio frame 'schedule' via higher layer signalling, or the a priori definition of a finite number of radio frame sequences (one of which is then selected and signaled to the user equipment at initial system access).

It may be noted that the normal data frames may also be used to carry Layer-3 (L3) messages.

Framing Control

There are several ways that a subscriber station (SS) 101-103 can determine the framing structure (and subframe types) within a radio frame. For example:

Blind (e.g., dynamically controlled by the BS but not signaled, so the SS must determine frame start in a radio frame. Frame start may be based on the presence of a pilot or control symbol within a frame.

Superframe (e.g., every 1 sec the BS transmits information specifying the frame configuration until the next superframe)

System deployment (base station) and registration (mobile)

Signaled in the radio frame synchronization and control part

Signaled in a first frame in a radio frame (may state map of other frames)

Within a control assignment allocating resources

In general, two or more frame durations and subframe types may be in a radio frame. If communication system 100 is configured such that the mix of short and long frames in a radio frame can vary, the possible starting locations of long frames could be fixed to reduce signaling/searching. Further reduction of signaling/searching is possible if a radio frame may have only a single frame duration, or a single subframe type. In many cases the determination of the framing structure of a radio frame also provides information on the location of control and pilot information within the radio frame, such as when the resource allocation control (next section) is located beginning in a second symbol of each frame (long or short).

Some control methods may be more adaptive to changing traffic conditions on a frame by frame basis. For example, having a per-radio frame control map within a designated subframe (first in radio frame, last of previous radio frame) may allow large packets (e.g., TCP/IP) to be efficiently handled in one radio frame, and many VoIP users to be handled in another. Alternatively, superframe signaling may be sufficient to change the control channel allocation in the radio frame if user traffic types vary relatively slowly.

Resource Allocation (RA) Control

A frame has an associated control structure—possibly uniquely associated—that controls the usage (allocation) of the resource to users. Resource allocation (RA) control is typically provided for each frame and its respective frame duration, in order to reduce delay when scheduling retransmissions. In many cases the determination of the framing structure of a radio frame also provides information on the location of the resource allocation control (per frame) within the radio frame, such as when the resource allocation control is located beginning in a second symbol of each frame (long or short). The control channel is preferably TDM (e.g., one or more TDM symbols), and located at or near the start of the frame, but could also alternatively occur distributed throughout the frame in either time (symbols), frequency (subcarriers), or both. One or two-dimensional spreading and code division multiplexing (CDM) of the control information may also be employed, and the various multiplexing methods such as TDM, FDM, CDM may also be combined depending on the system configuration.

In general, there may be two or more users allocated resources in a frame, such as with TDM/FDM/CDM multiplexing, though restricting to a single user per frame, such as TDM, is possible. Therefore, when a control channel is present within a frame, it may allocate resources for one or more users. There may also be more than one control channel in a frame if a separate control channel is used for resource allocation for two users in the frame.

This control field may also contain more information than just resource allocation for that frame. For example, on the downlink, the RA control may contain uplink resource allocation and acknowledgement information for the uplink. Fast acknowledgements corresponding to an individual frame maybe preferred for fast scheduling and lowest latency. An additional example is that the control field may make a persistent resource allocation that remains applicable for more than one frame (e.g., a resource allocation that is persistent for a specified number of frames or radio frames, or until turned off with another control message in a different frame)

The control information in a first frame of a radio frame (or last frame in a previous radio frame) may also provide framing (and therefore control locations) for either a next (or more generally, future) frame or the rest of the radio frame. Two additional variations:

Overlapping Control Zones: A control channel a first frame can make assignments to its own frame as well as some assignments in a second frame, and the control channel in the second frame makes additional assignments to the second frame. This capability may be useful for mixing different traffic types (e.g. VoIP and large packets) in a single radio frame.

Additional Scheduling Flexibility Within a radio frame (partial ambiguity): A control channel in the first frame (or Framing control MAP in the radio frame) may give a slightly ambiguous specification of the control map for the radio frame to enable more frame-by-frame flexibility. For example, the control map may indicate frame/control locations that are either definite or possible. A semi-blind receiver would know the definite locations, but would have to blindly determine if possible frame/control locations are valid.

Pilot Symbols

Pilot or reference symbols may be multiplexed in a frame or a subframe by TDM, FDM, CDM, or various combinations of these. Pilot symbols may be common (to be received and used by any user) or dedicated (for a specific user or a specific group of users), and a mixture of common and dedicated pilots may exist in a frame. For example, a common pilot symbol (CPS) reference symbol may be the first symbol within a subframe (TDM pilot), thereby providing substantially uniformly spaced common pilot symbols throughout the radio frame. The downlink and uplink may have different pilot symbol formats. Pilot symbol allocations may be constant, or may be signaled. For example, common pilot symbol locations may be signaled within the radio frame control for one or more RAFs. In another example, a dedicated pilot (in addition to any common pilot) is indicated in a frame within the RA control for the frame.

In one embodiment, the subframe definition may be linked to the common pilot spacing. For example, if a subframe is defined to include a single common pilot symbol, then the subframe length is preferably related to the minimum expected coherence time of the channel for the system being deployed. With this approach, the subframe duration may be determined simply by the common pilot spacing (certainly other ways to define the subframe length are also allowed). The common pilot spacing is primarily determined by channel estimation performance, which is determined by the coherence time, speed distribution, and modulation of users in the system. For example, pilots may be spaced one out of every 5 bauds to be able to handle 120 kph users with 50 us bauds (40 us useful duration+10 us cyclic prefix or guard duration). Note that baud as used here refers to the OFDM or DFT-SOFDM symbol period.

When the Doppler rate is very low, all or part of the common pilot may be omitted from certain frames or subframes, since pilots from a preceding or subsequent subframe/frame, or from the control region of a radio frame may be sufficient for channel tracking in this case. Moreover, no pilots would be needed if differential/non-coherent modulation is used. However, for simplicity of illustration, each subframe is shown with pilot symbols.

Uplink and Downlink

Figure 18:
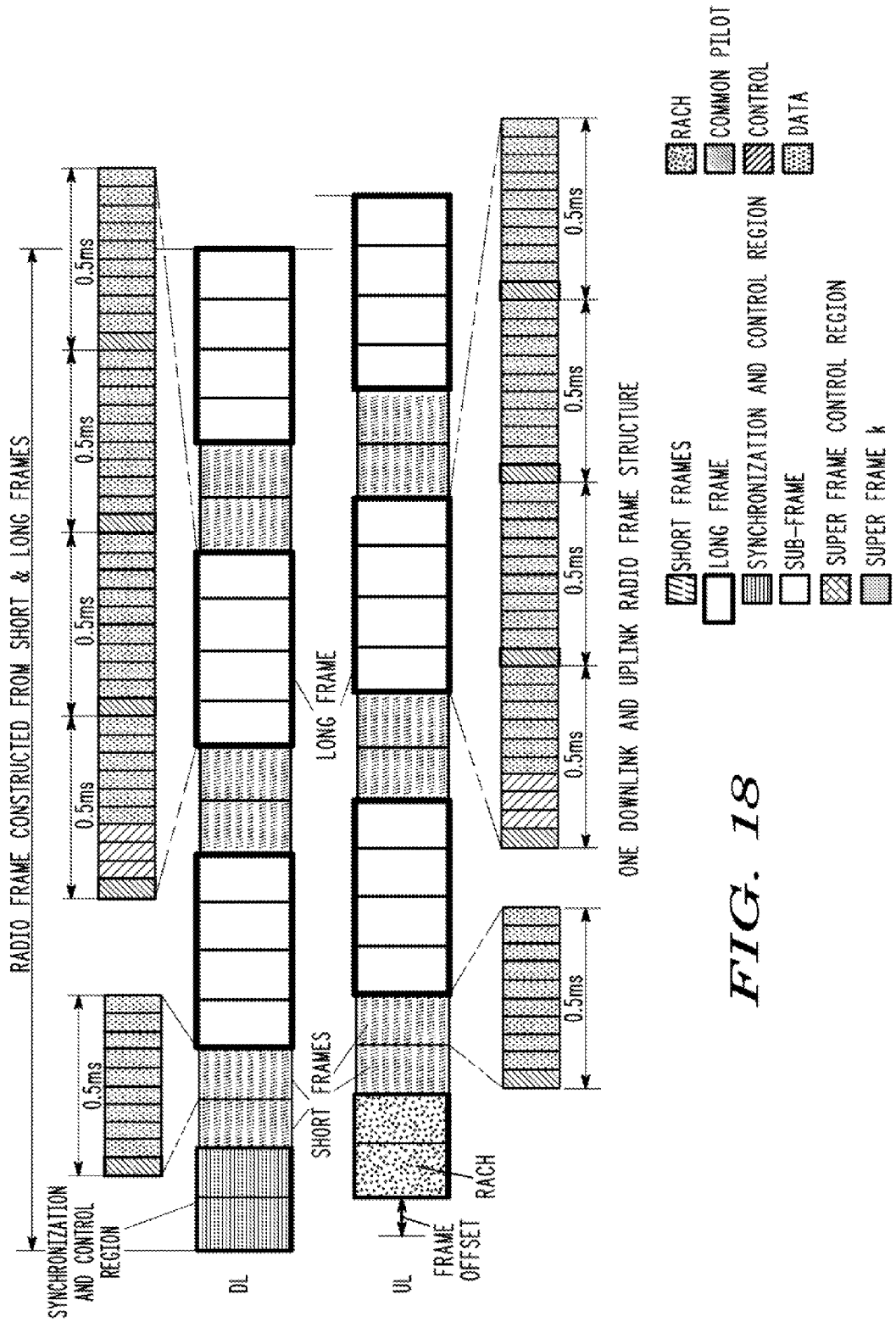
FIG. 18 shows the uplink subframes to be of the same configuration as the downlink subframes.

The radio frame configurations shown may be for either the uplink or the downlink of an FDD system. One example when used for uplink and downlink is shown in FIG. 18. FIG. 18 shows the uplink subframes to be of the same configuration as the downlink subframes, but in general they could have a different number of symbols per subframe or even have different subframe durations and different numbers of subframes per frame. The modulation for the uplink may different than the downlink, for example DS-CDMA, IFDMA or DFT-SOFDM (DFT-spread-OFDM) instead of OFDM. The uplink radio frame is shown offset from the downlink radio frame structure to facilitate HARQ timing requirements by allowing faster acknowledgments, although zero offset is also permissible. The offset may be any value, including one subframe, a multiple of subframes, or a fraction of a subframe (e.g. some number of OFDM or DFT-SOFDM symbol periods). The first subframes in the uplink radio frame may be assigned to be common control/contention channels such as random access channel (RACH) subframes and may correspond to the downlink synchronization and control subframes. Control frames (or more generally, messages) carrying uplink control information, CQI, downlink Ack/Nack messages, pilot symbols etc. can either be time or frequency multiplexed with the data frames.

Alternate Uplink

Figure 19:
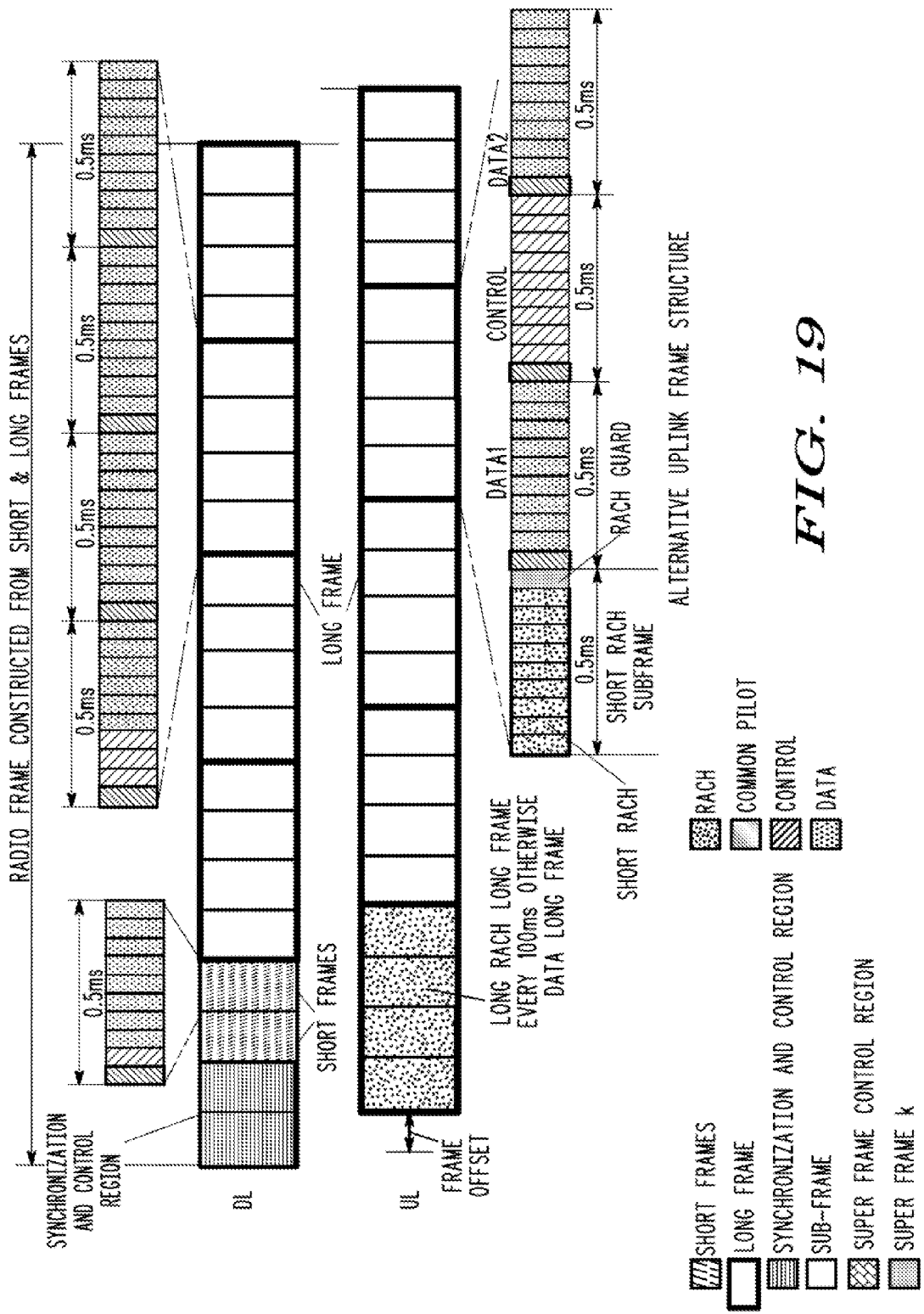
FIG. 19 through FIG. 21 show 2 ms long frames composed of 0.5 ms subframes that are of frame type long RACH, Data, or Composite.
Figure 20:
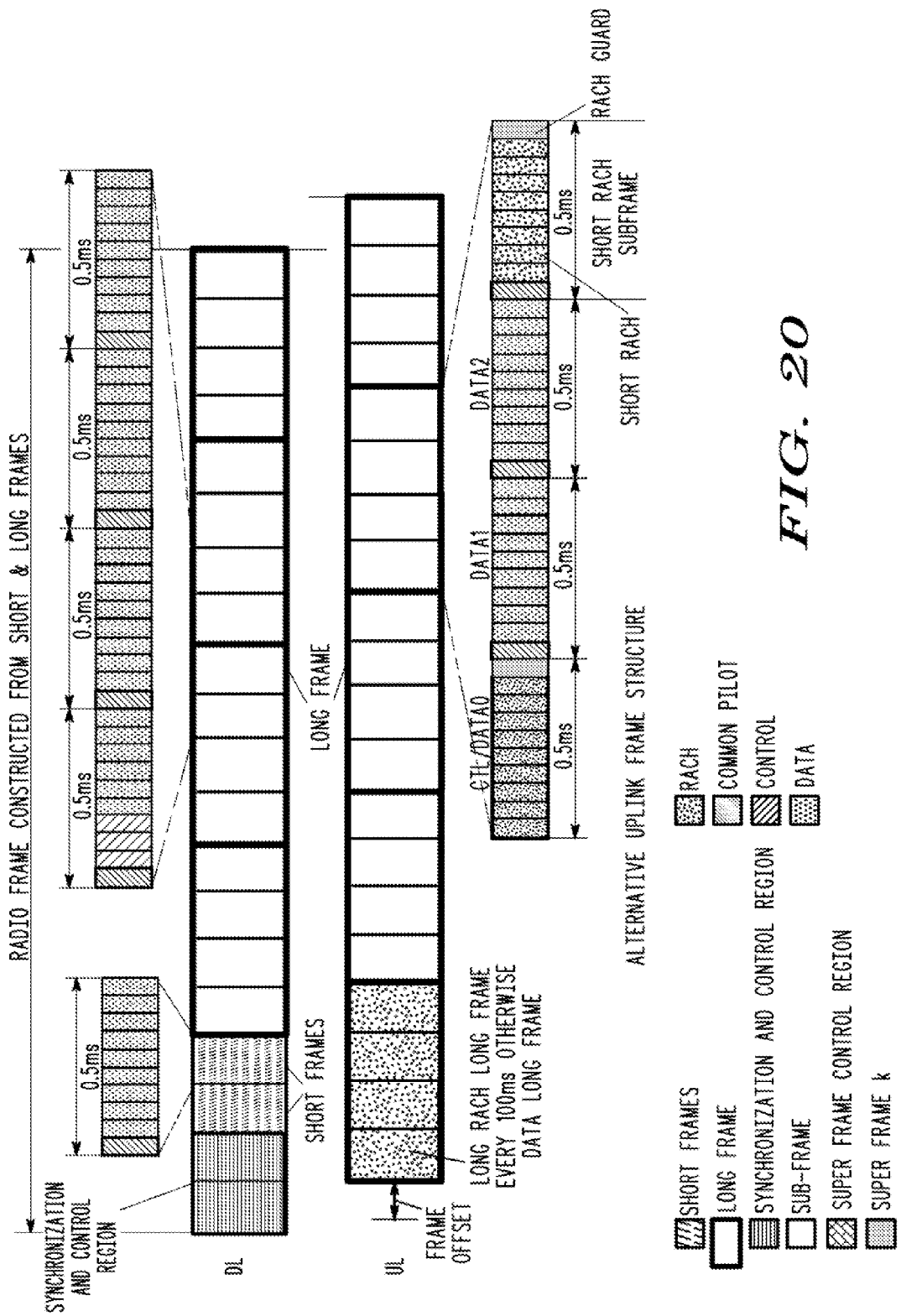
Figure 21:
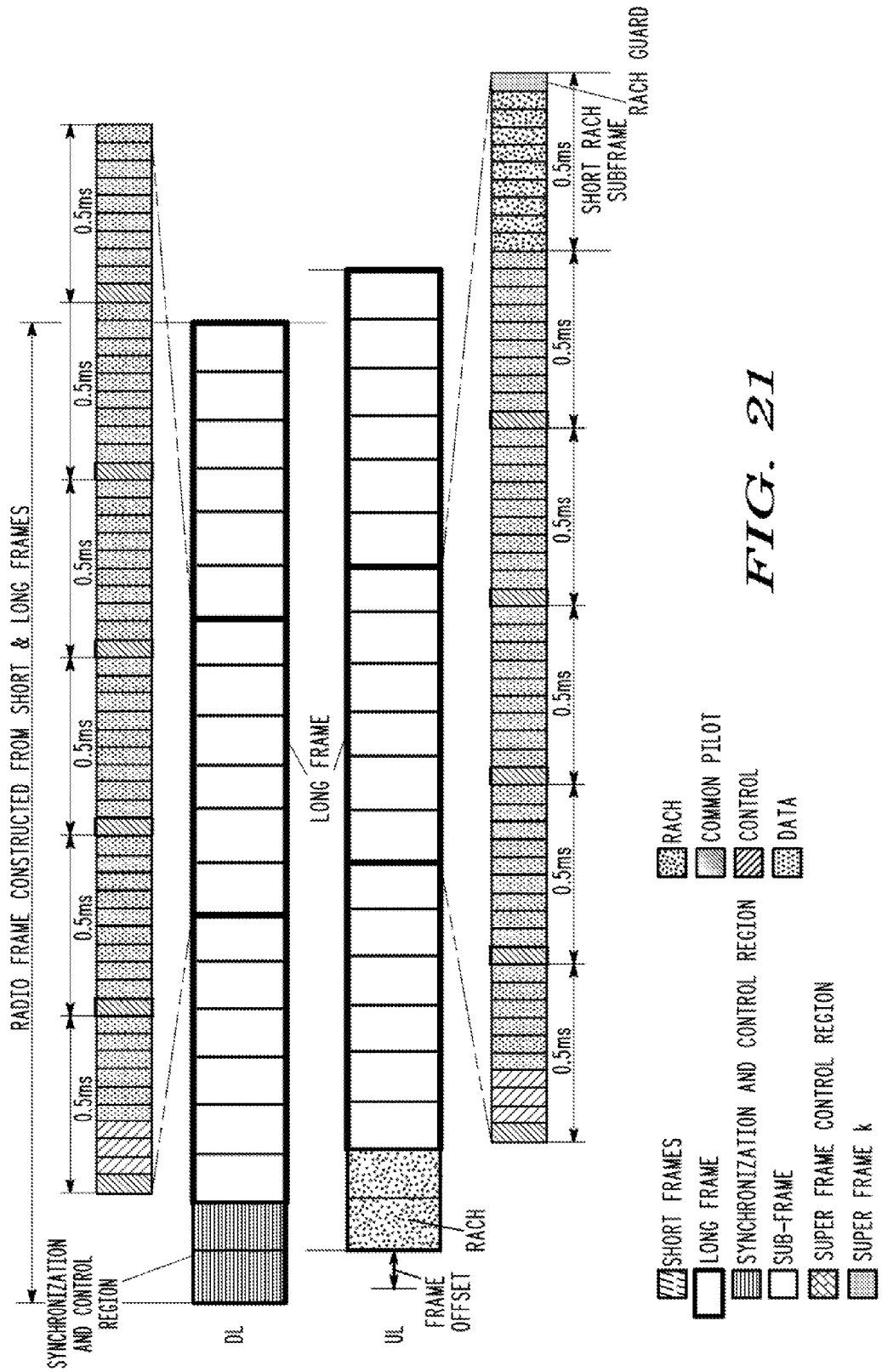

Two alternate FDD uplink structures are shown that have only one frame duration on the uplink. However, two or more long frame types are defined. In FIG. 19 and FIG. 20, 2 ms long frames composed of 0.5 ms subframes are of frame type long RACH, Data, or Composite. Long RACH may occur infrequently, such as every 100 ms. Composite frames have data, control, and a short RACH. The short RACH may be less than one subframe in duration. Data frames (not shown) are like Composite frames but with a short RACH replaced with a data subframe. Control, RACH, and pilot are all shown TDM, but could be FDM or combination TDM/FDM. As before, a subframe type is defined, and may be based on guard interval duration or for RACH frame or for IFDM/DFT-SOFDM & OFDM switching. FIG. 21 is similar to FIG. 19 and FIG. 20, but with frames of 6 subframes and type data or composite. If only composite data frames are used, every frame would contain control and short RACH. Long RACH occurs infrequently (shown once per subframe), with an integer (preferred) or non-integer number of subframes.

TDD

With time division duplexing (TDD), the system bandwidth is allocated to either uplink or downlink in a time multiplexed fashion. In one embodiment, the switch between uplink and downlink occurs once per several frames, such as once per radio frame. The uplink and downlink subframes may be the same or different duration, with the 'TDD split' determined with a subframe granularity. In another embodiment, both downlink and uplink occur within a long frame of two or more subframes, with the long frame of possibly fixed duration. A short frame of a single subframe is also possible, but turnaround within the frame is difficult or costly in terms of overhead. The uplink and downlink may be the same or different duration, with the 'TDD split' determined with a subframe granularity. In either embodiment, TDD overheads such as ramp-up and ramp-down may be included inside or outside subframes.

Scalable Bandwidth

Transmission may occur on one of two or more bandwidths, where the radio frame duration is the same for each bandwidth. Bandwidth may be 1.25, 2.5, 5, 10, 15, or 20 MHz or some approximate value. The subframe duration (and therefore smallest possible frame duration) is preferably the same for each bandwidth, as is the set of available frame durations. Alternatively, the subframe duration and multiple frame durations may be configured for each bandwidth.

Table 4 shows an example of six carrier bandwidths with a 22.5 kHz subcarrier spacing, and Table 5 shows an example of six carrier bandwidths with a 25 kHz subcarrier spacing. Note in Table 5 that the guard interval (e.g., cyclic prefix length) per symbol in the subframe is not constant, as described in the Subframe Type section. In a subframe all the symbols may not be of the same symbol duration due to different guard durations (cyclic prefix). For this example, a single symbol is given all excess samples; in other examples, two or three more guard interval values may be defined for the subframe. As another example, with a 15 kHz subcarrier spacing and 0.5 ms subframe duration, a short frame of 7 symbols may have an average CP of ~4.7 µs (microseconds), with 6 symbols having ~4.69 µs (9 samples at 1.25 MHz, scaling for higher bandwidths) and ~5.21 µs (10 samples at 1.25 MHz, scaling for higher bandwidths).

TABLE 4

OFDM numerology for different Carrier Bandwidths for Normal (Data) Subframes

| Parameter | Carrier Bandwidth (MHz) | | | | | |
|---|---|---|---|---|---|---|
| | 20 | 15 | 10 | 5 | 2.5 | 1.25 |
| frame duration (ms) | 0.5 | 0.5 | 0.5 | 0.5 | 0.5 | 0.5 |
| FFT size | 1024 | 768 | 512 | 256 | 128 | 64 |
| subcarriers (occupied) | 768 | 576 | 384 | 192 | 96 | 48 |
| symbol duration (us) | 50 | 50 | 50 | 50 | 50 | 50 |
| useful (us) | 44.44 | 44.44 | 44.44 | 44.44 | 44.44 | 44.44 |
| guard (us) | 5.56 | 5.56 | 5.56 | 5.56 | 5.56 | 5.56 |
| guard (samples) | 128 | 96 | 64 | 32 | 16 | 8 |

TABLE 4-continued

OFDM numerology for different Carrier
Bandwidths for Normal (Data) Subframes

| | Carrier Bandwidth (MHz) | | | | | |
|---|---|---|---|---|---|---|
| Parameter | 20 | 15 | 10 | 5 | 2.5 | 1.25 |
| subcarrier spacing (kHz) | 22.5 | 22.5 | 22.5 | 22.5 | 22.5 | 22.5 |
| occupied BW (MHz) | 17.28 | 12.96 | 8.64 | 4.32 | 2.16 | 1.08 |
| symbols per frame | 10 | 10 | 10 | 10 | 10 | 10 |
| 16QAM data rate (Mbps) | 49.15 | 36.86 | 24.58 | 12.29 | 6.14 | 3.07 |

TABLE 5

OFDM numerology for different Carrier
Bandwidths for Normal (Data) Subframes

| | Carrier Bandwidth (MHz) | | | | | |
|---|---|---|---|---|---|---|
| Parameter | 20 | 15 | 10 | 5 | 2.5 | 1.25 |
| frame duration (ms) | 0.5 | 0.5 | 0.5 | 0.5 | 0.5 | 0.5 |
| FFT size | 1024 | 768 | 512 | 256 | 128 | 64 |
| subcarriers (occupied) | 736 | 552 | 368 | 184 | 96 | 48 |
| symbol duration (us) | 45.45 | 45.45 | 45.45 | 45.45 | 45.45 | 45.45 |
| useful (us) | 40.00 | 40.00 | 40.00 | 40.00 | 40.00 | 40.00 |
| guard (us) | 5.45 | 5.45 | 5.45 | 5.45 | 5.45 | 5.45 |
| guard (samples) | 139.64 | 104.73 | 69.82 | 34.91 | 17.45 | 8.73 |
| regular guard (us) | 5.43 | 5.42 | 5.39 | 5.31 | 5.31 | 5.00 |
| irregular guard (us) | 5.70 | 5.83 | 6.09 | 6.87 | 6.87 | 10.00 |
| subcarrier spacing (kHz) | 25 | 25 | 25 | 25 | 25 | 25 |
| occupied BW (MHz) | 18.4 | 13.8 | 9.2 | 4.6 | 2.4 | 1.2 |
| subchannels | 92 | 69 | 46 | 23 | 12 | 6 |
| symbols per frame | 11 | 11 | 11 | 11 | 11 | 11 |
| 16QAM data rate (Mbps) | 52.99 | 39.74 | 26.50 | 13.25 | 6.91 | 3.46 |

ARQ

ARQ or HARQ may be used to provide data reliability. The (H)ARQ processes may be different or shared across subframe types (e.g., normal and broadcast), and maybe different or shared across frame durations. In particular, retransmissions with different frame duration may be allowed or may be prohibited. Fast acknowledgements corresponding to an individual frame maybe preferred for fast scheduling and lowest latency.

HARQ

The multi-frame concept may be used with ARQ for reliability or with HARQ for additional reliability. An ARQ or HARQ scheme may be a stop-and-wait (SAW) protocol, a selective repeat protocol, or other scheme as known in the art. A preferred embodiment, described below, is to use a multi-channel stop-and-wait HARQ modified for multi frame operation.

The number of channels in an N-channel SAW HARQ is set based on the latency for a round-trip transmission (RTT). Enough channels are defined such that the channel can be fully occupied with data from one user, continuously. The minimum number of channels is therefore 2.

If turnaround time is proportional to frame length, both short and long frames could use the same N channels (e.g., 3).

If turnaround time is relatively fixed, then the number of channels needed for the short frame duration will be the same or more than that for the long frame duration. For example, for 0.5 ms subframe and short frame, and 3 ms long frame, and also given 1 ms turnaround time between transmissions (i.e. the effective receiver processing time to decode a transmission and then respond with required feedback (such as ACK/NACK)) would have 3 channels for the short frame and 2 for the long frames.

If there is an infrequent switch from one frame size to another and no mix of frame durations in a radio frame, then one could terminate existing processes on a switch of frame sizes, and the number of channels and signaling for HARQ for each frame size could be independent. In the case of a dynamic frame duration or TTI, the number of subframes concatenated can be dynamically varied for at least the initial transmission and possibly for the retransmission. If retransmissions of a packet are allowed to occur on different frame types, the HARQ processes may be shared between the frame durations (e.g., a HARQ process identifier could refer to either a short or long frame in an explicit or implicit manner). The number of channels required may be defined based on multiplexing a sequence of all short or all long frames, taking into consideration whether packets have a relatively fixed or proportional turnaround (e.g., decoding and ACK/NACK transmission). For a fixed turnaround, the N may be primarily determined based on the short frame multiplex requirements. With proportional turnaround, the required N may be roughly the same for both short and long frame multiplexes. Designing the N to handle arbitrary switching between short and long frames may require additional HARQ channels (larger N). For example, consider a N=3 requirement for each of a short or a long frame multiplex (proportional turnaround), with a long frame equal in duration to four short frames. Clearly, sequences of HARQ channel usage may be all short (1, 2, 3, 1, 2, 3 . . . ) or all long (1, 2, 3, 1, 2, 3 . . . ) without restriction. However, a long frame (with channel ID 1) must be followed by the equivalent span of two long frames before channel 1 can be used to retransmit either a short or a long frame. In the span of these two long frames, channels 2 and 3 can be used for short frames, but at that point since channel 2 can not be reused yet and channel 1 is unavailable, an extra channel 4 must be used. For N<=(#short frames in a long frame), the total number of channels required may be N+(N−1). This can be seen continuing the above example if two long frames (channel ID 1 and 2) are followed by short frames, requiring channel IDs 3 and 4 and 5 before channel 3 can be reused. In this example, five channels is more than the three required for either individual multiplex.

Multi-Dimensional (Time, Frequency, and Spatial) HARQ

In contrast to defining N solely based on turnaround time, it may be more efficient (e.g. in terms of coding and resource allocation granularity) to allow remote units 101-103 to be scheduled with more than one packet for a given frame or scheduling entity. Instead of assuming one HARQ channel per frame for a remote unit, up to N2 HARQ channels are considered. Hence, given N-channel stop and wait HARQ, where N is solely based on turnaround time, and that each frame would also have N2 HARQ channels for the remote unit, then up to N×N2 HARQ channels are supported per remote unit. For example, each consecutive long frame would correspond to one of the N channels of an N-channel stop and wait HARQ protocol. Since each long frame is composed of 'n' subframes then if each subframe is also allowed to be a HARQ channel then we would have up to N×n HARQ channels per remote unit. Hence, in this case the individually acknowledgeable unit would be a subframe instead of a long frame. Alternatively, if there were 'p' frequency bands defined per carrier then each one could be a HARQ channel resulting in up to N×p HARQ channels per remote unit. More generally, for 's' spatial channels, there could be up to 'n'× 'p'×'s'×'N' HARQ channels per remote unit. Parameter 'n' could be even larger if it was defined on an OFDM symbol basis were there are T OFDM symbols per subframe. In any case, a channel may not be reused until the time restriction associated with N has passed, as with unmodified HARQ.

Another method of dimensioning the number of HARQ channels is to determine a maximum number of maximum length packets that can be allocated on a frame, such as with the maximum modulation and coding rate and 1500 byte (+overhead) packets. Smaller packets could be concatenated to the maximum aggregate packet size for a channel. For example, if N=2 (for a minimum round trip time (RTT)), and if 4 packets can be transmitted in a subframe with 64QAM R=3/4 and closed loop beamforming enabled, then 8=2*4 channels are needed for short frames and 32 channels needed for 4 subframe long frames. If retransmissions of a packet are allowed to occur on different frame types, in this example the number of channels may be further adjusted, as above.

The control signaling would require modification to support HARQ signaling modified for short/long frames or for HARQ channel dimensioning not based solely on turnaround time. In one embodiment corresponding to an EUTRA application, modification to the current use of "New Data indicator (NDI)", "Redundancy Version indicator (RVI)", "HARQ channel indicator (HCI)", and "Transport block size (TBS)" as well as ACK/NACK and CQI feedback. Other technical specifications may use similar terminology for HARQ. In one example, up to 'n' or 'p' remote unit packets may be sent in one long frame transmission. Each packet could be assigned separate frequency selective (FS) or frequency diverse (FD) resource elements along with distinct control signaling attributes (NDI, RVI, HCI, and TBS). Color coding, such as seeding the cyclic redundancy check (CRC) calculation with a remote unit identity, may be applied to each downlink packet's CRC to indicate the target remote unit. Some extension of the HCI field (e.g. #bits=$\log_2$('n'x'N')) will be needed for correctly performing soft buffer combining of packet transmissions. Similarly, ACK/NACK feedback would likely require a HCI field or color coding to indicate which set of a remote unit's packets in a short or long frame transmission are being ACKed or NACKed.

Frequency Selective Allocations

Figure 22:
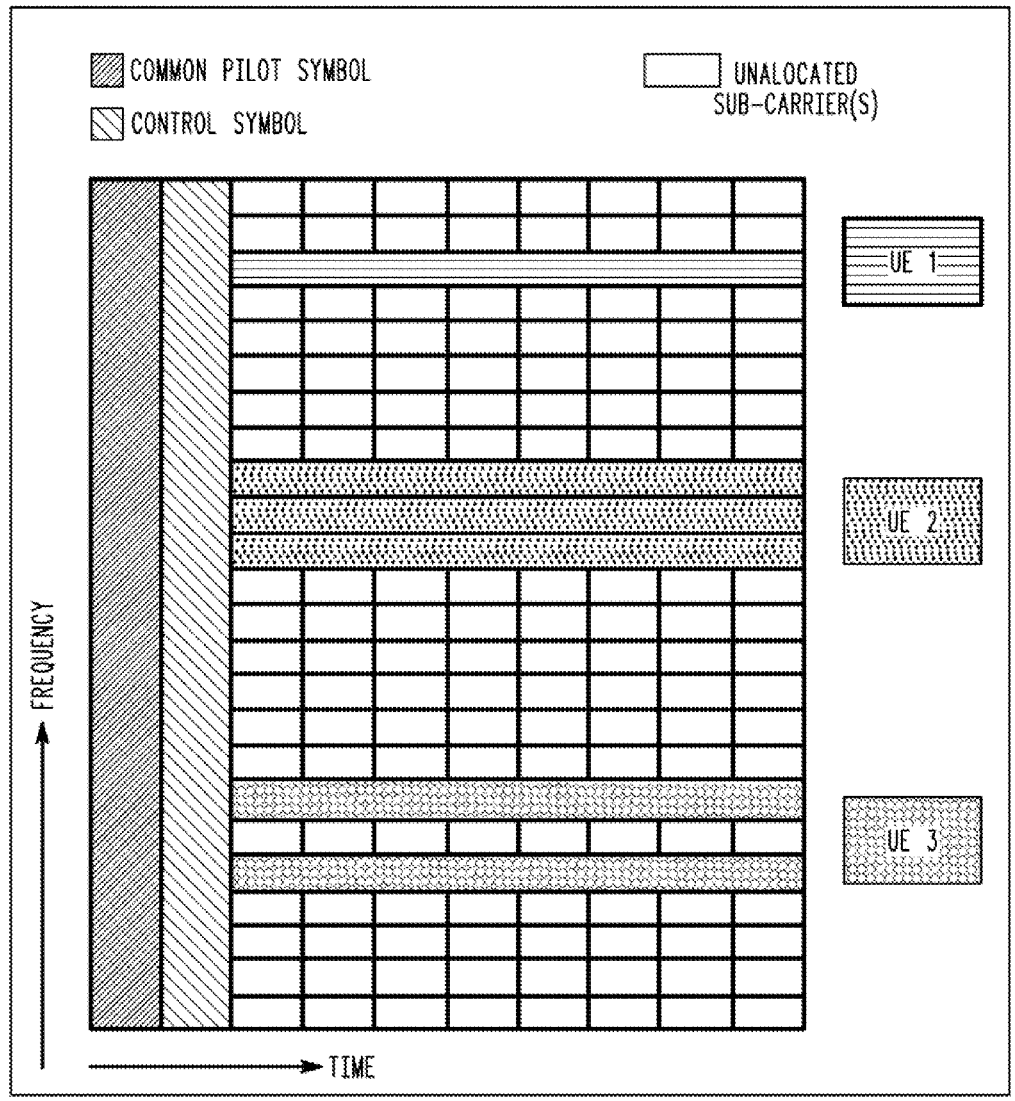
FIG. 22 through FIG. 24 show short frame frequency selective (FS) and frequency diverse (FD) resource allocations respectively for several users.
Figure 23:
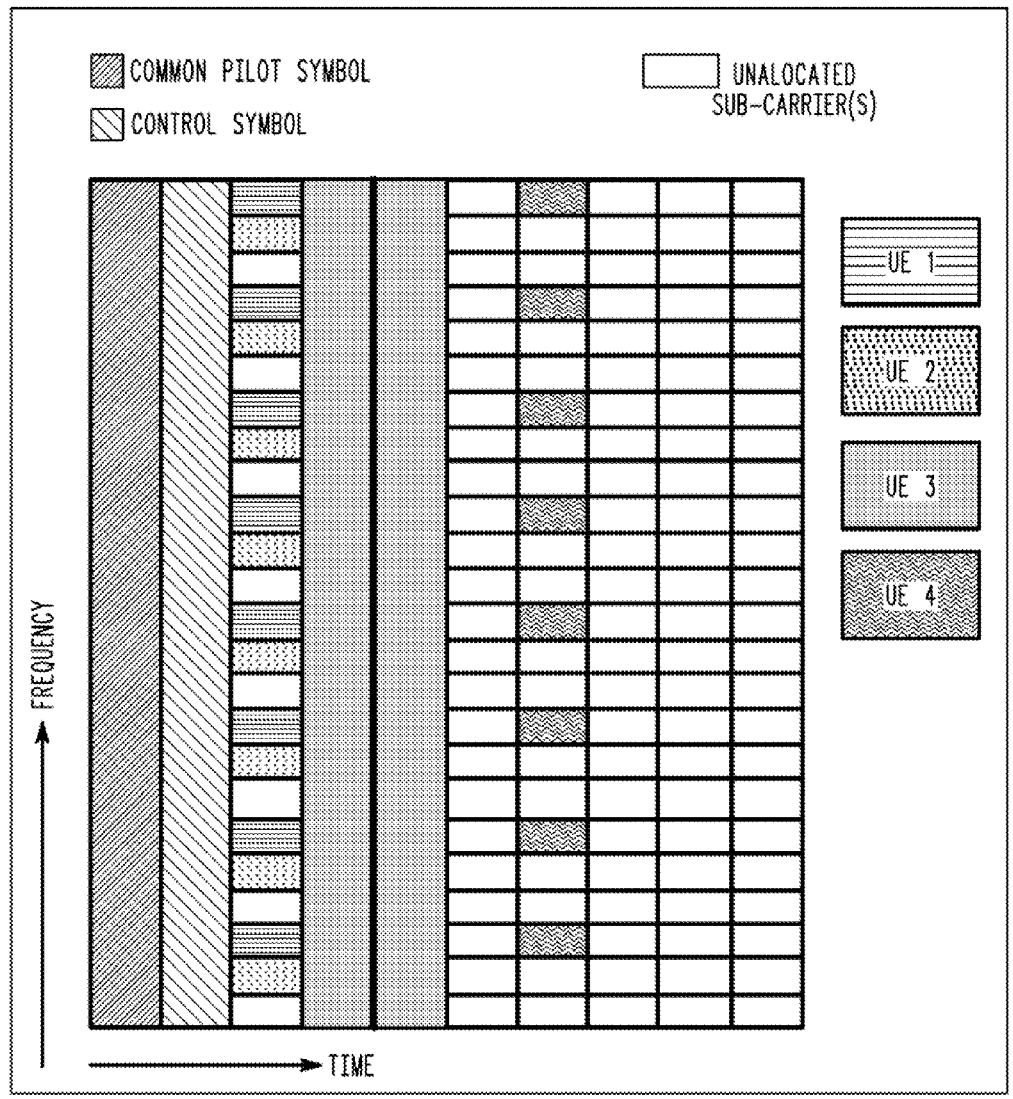

FIG. 22 and FIG. 23 show short frame frequency selective (FS) and frequency diverse (FD) resource allocations respectively for several users. For FS scheduling a resource element (or resource block or resource unit or chunk) is defined to consist of multiples of sub-carriers such that a carrier bandwidth is divided into a number (preferably an integer number) of assignable RE (e.g., a 5 MHz carrier with 192 subcarriers would have 24 RE of 8 subcarriers each). To reduce signaling overhead and better match channel correlation bandwidth of typical channels (e.g. 1 MHz for Pedestrian B and 2.5 MHz for Vehicular A) a RE might be defined to be px8 sub-carriers where 'p' could be 3 and still provide the resolution needed to achieve most of the FS scheduling benefit. The number of subcarriers used as the basis for multiples may also be set to a number different than 8 (e.g., such that the total RE size is 15 or 25 if the number of subcarriers is 300 in 5 MHz, or 24 subcarriers if the number of subcarriers is 288).

Figure 24:
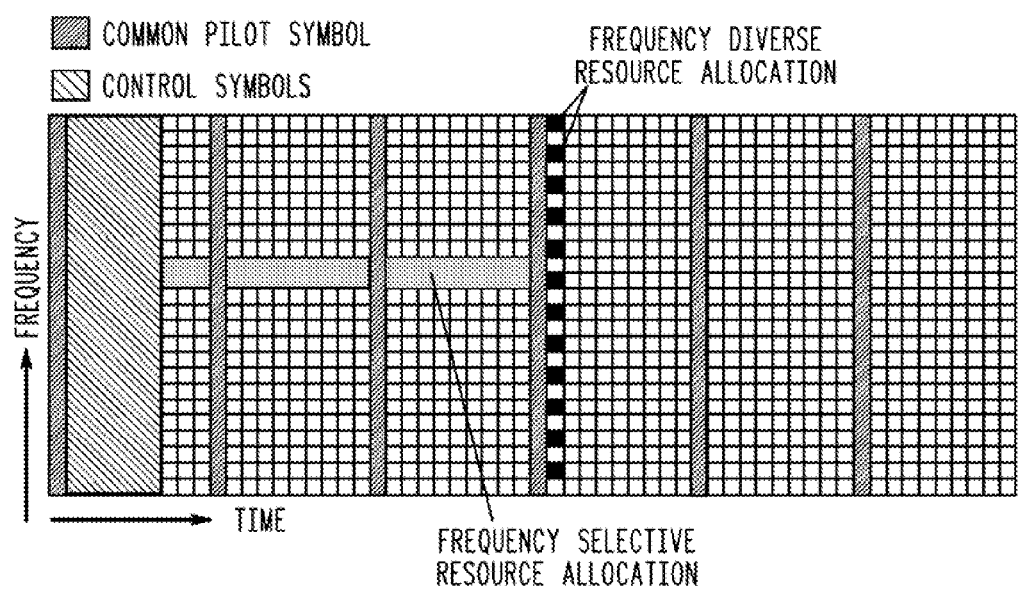

Similarly in FIG. 24 FS and FD resources may be allocated in the same long frame. It may be preferred, however, not to allocate FS and FD resources over the same time interval to avoid resource allocation conflicts and signaling complexity.

While the invention has been particularly shown and described with reference to a particular embodiment, it will be understood by those skilled in the art that various changes in form and details may be made therein without departing from the spirit and scope of the invention. It is intended that such changes come within the scope of the following claims. For example, in the case of a transmission system comprising multiple discrete carrier frequencies signaling or pilot information in the frame may be present on some of the component carrier frequencies but not others. In addition, the pilot and/or control symbols may be mapped to the time-frequency resources after a process of 'bandwidth expansion' via methods of direct sequence spreading or code-division multiplexing. In another example, the frame structure can be used with MIMO, Smart Antennas and SDMA, with same or different frame durations for simultaneous SDMA users.

The invention claimed is:

1. A method for transmitting data within a communication system, the method comprising the steps of:
   receiving data to be transmitted over a radio frame, wherein the radio frame is comprised of a plurality of subframes;
   selecting a frame length comprising multiple subframes;
   selecting a subframe type from one of two or more types of subframes for the multiple of subframes; wherein one or more types of subframes comprise broadcast subframes and unicast subframes wherein the each of the broadcast subframes and the unicast subframes comprise a cyclic prefix and wherein a length of the cyclic prefix identifies if a particular subframe is a broadcast subframe or a unicast subframe;
   placing the data within the multiple subframes to produce multiple subframes of data; and
   transmitting the frame having the multiple subframes of data and the subframe type over the radio frame.

2. The method of claim 1 wherein the subframe type is distinguished a parameter taken from the group consisting of: a guard interval, a subcarrier spacing, a number of subcarriers, a FFT size, and a pilot format.

3. The method of claim 1 wherein the each subframe type from the two or more types of subframes comprises a differing number of OFDM symbols or a differing number single carrier FDMA symbols.

4. The method of claim 1 further comprising the step of using a blank subframe for interference avoidance, interference measurements, or when data is not present in the frame.

5. The method of claim 1 further comprising the step of:
   multiplexing common control channels into the radio frame.

6. The method of claim 5 wherein the common control channels comprises one or more of broadcast channels, paging channels, synchronization channels, random access channels, or pilot channels.

7. The method of claim 5 wherein the common control channels indicate the subframes and radio frames to be used for broadcast.

8. The method of claim 1 further comprising the step of:
   inserting an overhead region within the radio frame and the radio frame comprises the plurality of subframes and an overhead region.

9. The method of claim 1 further comprising the step of:
   determining a frame start in the radio frame via a presence of a pilot or control symbol within the radio frame.

10. The method of claim 1 further comprising the step of:
    signaling a partition of the radio frame at system deployment, at registration, within frame synchronization and control, within a designated subframe in a radio frame, within a first subframe in the radio frame, last subframe of a previous radio frame, or within a control assignment allocating resources.

11. The method of claim 1 wherein the step of transmitting the frame comprises the step of transmitting the frame in an allowed location.

12. The method of claim 1 wherein selecting a frame further comprises selecting a frame duration from two or more possible frame durations.

13. The method of claim 12 wherein the step of selecting the frame duration comprises the step of selecting the frame duration based on a user's speed, Doppler, radio channel condition, carrier or channel bandwidth, user location in the cell, and data rate, QoS, latency requirement, packet size, error rate, allowable number of retransmissions a remote unit capability, a cell size, a carrier frequency, proximity to other wireless systems, a channel or carrier bandwidth, based on achieving backwards compatibility with another system, based on the number of users to be scheduled in a frame, based on the system load, based on or a number of users in each cell, based on a modulation type, or based on a traffic type.

14. The method of claim 12 wherein the frame duration is 2 ms, 1.67 ms, or 0.5 ms.

15. The method of claim 1 further comprising the step of:
placing a resource allocation control within the multiple subframes.

16. The method of claim 15 wherein the step of placing the resource allocation control comprises the step of time multiplexing the resource allocation control.

17. The method of claim 15 wherein the resource allocation control allocates resources for one user or more than one user.

18. The method of claim 15 wherein the resource allocation control contains uplink resource allocation and/or acknowledgment information.

19. The method of claim 15 wherein the resource allocation control comprises a persistent resource allocation that remains applicable for more than one frame.

20. The method of claim 15 wherein the persistent resource is persistent for a specified number of subframes or radio frames or turned off with a control message in a different frame.

21. The method of claim 15 wherein the resource allocation control provides a location for resource allocation control for either a next frame or a rest of the radio frame.

22. The method of claim 15 further comprising the step of:
multiplexing a common control channel into the radio frame, wherein the common control channel indicates a location of the resource allocation control within the radio frame.

23. The method of claim 15 further comprising the step of:
selecting a second frame, wherein the resource allocation control allocates resources in the first frame and in the second frame.

24. The method of claim 15 further comprising the step of:
selecting a second frame;
placing within the multiple subframes an indication of the location of a resource allocation control for the second frame.

25. The method of claim 15 wherein selecting a frame further comprises selecting a frame duration from two or more possible frame durations.

* * * * *